United States Patent [19]
Kondo

[11] Patent Number: 6,151,233
[45] Date of Patent: Nov. 21, 2000

[54] SYNCHRONOUS RECTIFIER CIRCUIT

[75] Inventor: Katsuyoshi Kondo, Nara, Japan

[73] Assignee: Sharp Kabushiki Kaisha, Osaka, Japan

[21] Appl. No.: 09/224,057

[22] Filed: Dec. 31, 1998

[30] Foreign Application Priority Data

Feb. 10, 1998 [JP] Japan ................................. 10-028987

[51] Int. Cl.$^7$ ............................... H02M 7/00; G05F 1/40
[52] U.S. Cl. .......................... 363/125; 323/282; 363/127
[58] Field of Search ..................................... 363/125, 126, 363/127, 89, 21; 323/282, 283, 222

[56] References Cited

U.S. PATENT DOCUMENTS 5,072,171  12/1991  Eng ......................................... 323/283
5,341,085   8/1994  Ettes ....................................... 323/222

FOREIGN PATENT DOCUMENTS 9-261950  10/1997  Japan .

*Primary Examiner*—Peter S. Wong
*Assistant Examiner*—Rajnikant B. Patel

[57] ABSTRACT

In a switching power circuit adopting the synchronous rectifying system, when a first switch is cut-off, current $I_L$ of an inducing element is maintained by a commutating diode, and the inducing element releases an energy which was stored in a conduction period of the first switch. A second switch connected in parallel to the commutating diode is conducted so as not to be overlapped with the conduction period of the first switch. In the conduction period of the second switch, the current $I_L$ does not flow through the commutating diode, and it is possible to prevent lowering of efficiency caused by forward voltage drop. An inducing element current detecting circuit monitors the current $I_L$ and, when the current $I_L$ is reversing its direction, instructs a control circuit to cut-off the second switch. As a result, no reverse current flows through the inducing element even when the load is small, thus realizing a switching power circuit always having high efficiency.

4 Claims, 21 Drawing Sheets

SYNCHRONOUS RECTIFIER CIRCUIT

BACKGROUND OF THE INVENTION

1. Field of the Invention

The present invention relates to a synchronous rectifier circuit adopting a synchronous rectifying system, which is one type of switching power circuits in which input power is outputted after interrupting the input power in proportion to a predetermined output and after smoothing, and particularly relates to a synchronous rectifier circuit whose efficiency is not lowered even in light-load operation.

2. Description of the Background Art

Switching power circuits have been widely used conventionally as small power circuits having high efficiency. The switching power circuits output an input power after interruption and smoothing, and adjust the proportion of the input power when interrupting in accordance with an output voltage or output current, thus supplying a voltage or current of a constant value to a load, regardless of a change in load.

In recent years, various methods have been proposed to further improve the efficiency of the switching power circuit, and for example, Japanese Unexamined Patent publication No. 261950/1997 (Tokukaihei 9-261950) discloses a switching power circuit (synchronous rectifier circuit) adopting a synchronous rectifying system.

As shown in FIG. 20, in a conventional synchronous rectifier circuit 101, input voltage Vin inputted to input terminal IN is applied to output terminal OUT via an inducing element 112 and a first switch 111 while the first switch 111 is being conducted. In order to maintain output voltage Vout constant, the output terminal OUT is grounded via a smoothing capacitor 113.

Under this condition, the inducing element 112 stores an energy, and current $I_L$ flowing through the inducing element 112 in a direction towards the output terminal OUT is increased, as shown in FIG. 21, with the slope of (Vin−Vout)/L (period between ta and tb in FIG. 21).

Meanwhile, a commutating diode 114 and a second switch 115 are provided parallel to a series circuit composed of the inducing element 112 and the smoothing capacitor 113. When the first switch 111 is cut-off (at time tb), the current $I_L$ flowing through the inducing element 112 is maintained by the commutating diode 114 and the second switch 115 being conducted. Under this condition, the energy stored in the inducing element 112 is released, and the current $I_L$ is reduced with the slope −Vout/L (period between tb and te). At time te, the first switch 111 is conducted again, and the inducing element 112 starts storing energy.

The first and second switches 111 and 115 are controlled by a control circuit 121. The control circuit 121 controls the ratio of conduction period to cut-off period of the first switch 111 by monitoring the output voltage Vout so that the output voltage Vout takes a certain value. Here, when the first switch 111 and the second switch 115 are conducted at the same time, the input terminal IN is grounded via the first and second switches 111 and 115, and as a result an extremely large feedthrough current flows. Thus, the control circuit 121 provides a predetermined dead time Tdet between the switching timing of the first switch 111 and the switching timing of the second switch 115 so that the first switch 111 and the second switch 115 are not conducted simultaneously.

In this structure, while the second switch 115 is being conducted, the current $I_L$ flowing through the inducing element 112 flows mainly through the second switch 115, and essentially no current flows through the commutating diode 114. Therefore, even in heavy-load operation in which output load current Iout is large, a forward voltage loss due to the commutating diode 114 is not generated, thus realizing synchronous rectifier circuit 101 having superb efficiency.

However, the synchronous rectifier circuit 101 having the described structure has a problem that the efficiency is often lowered in light-load operation. Specifically, in light-load operation, the load current Iout is notably small, and the control circuit 121 sets a long cut-off period of the first switch 111. As a result, there is a case where the first switch 111 is not conducted even after time tx at which all the energy stored in the inducing element 112 in the conduction period of the first switch 111 has been released. In such a case, contrary to the normal operation, the current flows from the output terminal OUT to GND via the inducing element 112 and the second switch 115. As a result, the conversion efficiency of the synchronous rectifier circuit 101 is reduced to 50 percent or less.

Note that, when the second switch 115 has a polarity, the reverse current can be prevented. However, when a MOSFET is adopted as the second switch 115, the current also flows in a direction opposite to the polarity by the body diode formed in the MOSFET. Here, for example, when a commutating element such as diode is connected in series to the MOSFET to eliminate the reverse current, the efficiency in heavy-load operation is reduced by the forward voltage of the diode.

SUMMARY OF THE INVENTION

An object of the present invention is to provide a synchronous rectifier circuit having high conversion efficiency even in light-load operation. In order to achieve this object, a synchronous rectifier circuit of the present invention includes a first switch, whose ratio of conduction period to cut-off period is controlled in accordance with an output to an output terminal; an inducing element, connected to the first switch, for storing an energy of a first current flowing through itself; a rectifier element, connected to the inducing element; a second switch, connected in parallel to the rectifier element, which is conducted so as not to be overlapped with the conduction period of the first switch; and a control circuit for cutting off the second switch in a period after an energy stored in the inducing element while the first switch is being conducted is all released, regardless of whether the first switch is being conducted or cut-off. Note that, whether or not the energy stored in the inducing element while the first switch is being conducted has all been released can be decided, for example, by measuring or estimating the first current flowing through the inducing element.

With this structure, while the second switch is being conducted, the rectifier element connected in parallel to the second switch is by-passed by the second switch, and essentially no current flows through the rectifier element. Thus, a loss, such as a forward voltage loss of the rectifier element, which occurs when a current flows through the rectifier element is not generated. As a result, the synchronous rectifier circuit is capable of supplying power with high efficiency even in heavy-load operation, which requires a large amount of current to be outputted.

In light-load operation, the proportion of conduction period of the first switch is significantly shorter compared with the case of normal operation. Thus, as it has been done conventionally, when the second switch is controlled with the only condition that the conduction period of the second switch does not overlap with that of the first switch, the second switch is kept conducted even after the energy stored in the inducing element in the conduction period of the first switch is all released, and as a result a reverse current flows through the inducing element. In this case, the inducing element stores an energy having the opposite sign to that of the energy which had been stored originally. Thus, when the first switch is conducted again, it is required to cancel the energy of opposite sign, and as a result the efficiency of the synchronous rectifier circuit is lowered significantly.

In contrast, in the synchronous rectifier circuit in accordance with the present invention, the second switch is cut-off by the control circuit in a period after the energy stored in the inducing element in the conduction period of the first switch is all released, and therefore the reverse current does not flow through the inducing element. As a result, it is possible to realize a synchronous rectifier circuit having high efficiency even in light-load operation. Accordingly, the synchronous rectifier circuit is capable of always supplying power with high conversion efficiency, regardless of the load.

The present invention is applicable to synchronous rectifier circuits of various types, such as step-down type, step-up type, reversed type, and up-down type, provided that they are all synchronous rectifier circuits. For example, in the case of a synchronous rectifier circuit of the step-down type, the inducing element is provided between the input and output terminals, and the first switch is provided between the inducing element and the input terminal, and the rectifier element has a terminal which is connected between the first switch and the inducing element, and has a polarity for maintaining the first current. In the case of a synchronous rectifier circuit of the step-up type, the inducing element is provided between the input and output terminals, and the rectifier element is provided between the inducing element and the output terminal, and has a polarity for maintaining the first current, and the first switch has a terminal which is connected between the inducing element and the rectifier element. In the case of the reversed type, the first switch is provided between the input and output terminals, and the rectifier element is provided between the first switch and the output terminal, and has a polarity in a direction from the output terminal to the input terminal, and the inducing element has a terminal which is connected between the rectifier element and the first switch. In the case of the up-down type, in addition to the structure of the step-up type or of the reversed type, there are provided a capacitor between (i) a junction of the first switch and the inducing element and (ii) the rectifier element, and a short-circuiting inducing element or a short-circuiting resistance, having a terminal which is connected between the capacitor and the rectifier element.

Incidentally, various methods are available for deciding whether the energy stored in the inducing element in the conduction period of the first switch has all been released. For example, with the provision of the inducing element current detecting circuit for monitoring the first current, it is ensured that the time all the energy is released is recognized, and it is possible to prevent lowering of conversion efficiency caused by recognition error.

As another example, it is possible to provide an estimation circuit for calculating, in accordance with the voltage of the input terminal and the voltage of the output terminal, the time the energy stored in the inducing element in the conduction period of the first switch is all released. In this case, the time all the energy is released is calculated without direct measurement of the first current flowing through the inducing element. Therefore, a loss generated when measuring the current by a resistance component is prevented, and it is also possible to prevent the size of the synchronous rectifier circuit from being increased by an element which measures current by detecting magnetic field, thereby realizing a compact synchronous rectifier circuit with a small loss.

The synchronous rectifier circuit in accordance with the present invention may further include a voltage-current converting section for generating a current in accordance with the amount of change of the first current, based on the voltage of the input terminal and the voltage of the output terminal, and based on whether the first switch is being conducted, a storage capacitor having a first terminal which is connected to an output of the voltage-current converting section, and a control section for controlling the second switch in accordance with the voltage of the first terminal of the storage capacitor. Note that, the amount of change of the first current can be calculated from the voltages of the input and output terminals, provided that whether or not the first switch is being conducted has been decided. For example, in the case of a synchronous rectifier circuit of a step-down type, when the input and output voltages are Vin and Vout, respectively, and when the reactance of the inducing element is L, the amount of change of the first current becomes, for example, (Vin−Vout)/L, if the first switch is being conducted, and becomes (−Vout/L), if the first switch is being cut-off.

In the described structure, the voltage-current converting section determines the amount of change of the first current as calculated in accordance with the voltages of the input and output terminals, and generates a current having an amount in accordance with the amount of change. The current thus generated is stored in the storage capacitor, and therefore the voltage of the first terminal of the storage capacitor is changed in accordance with the integrated value of the amount of change, that is, in accordance with the amount of the first current. As a result, it is possible to estimate with very high accuracy the first current and the time the first current reverses its direction, namely the time all the energy is released. Therefore, it is ensured that the reverse current is prevented from flowing through the inducing element, and as a result the conversion efficiency of the synchronous rectifier circuit is further improved.

Further, because the voltage-current converting section and the control section are realized by analog circuits, such as amplifier, it is possible to integrate these circuits with other circuits of the synchronous rectifier circuit, for example, with a circuit for deciding the conduction period of the first switch. Also, compared with the case where the circuits are realized by digital circuits, the size of the circuits and the power consumption can be reduced. Therefore, it is possible to realize a smaller synchronous rectifier circuit having low power consumption.

For a fuller understanding of the nature and advantages of the invention, reference should be made to the ensuing detailed description taken in conjunction with the accompanying drawings.

DESCRIPTION OF THE EMBODIMENTS

Figure 1:
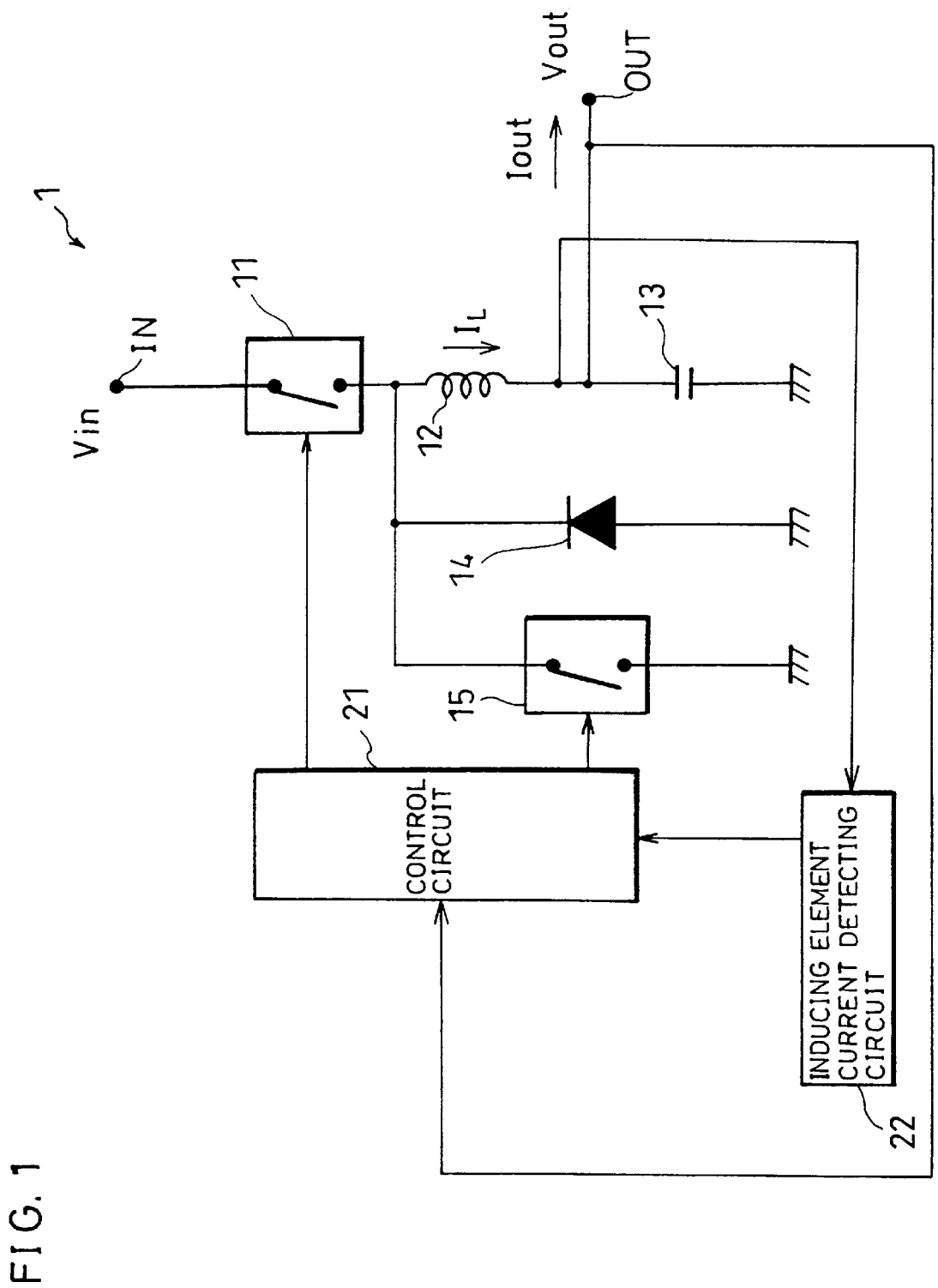
FIG. 1 is a block diagram, which indicates a First Embodiment of the present invention, showing a main component of a switching power circuit of a step-down type adopting the synchronous rectification system.
Figure 2:
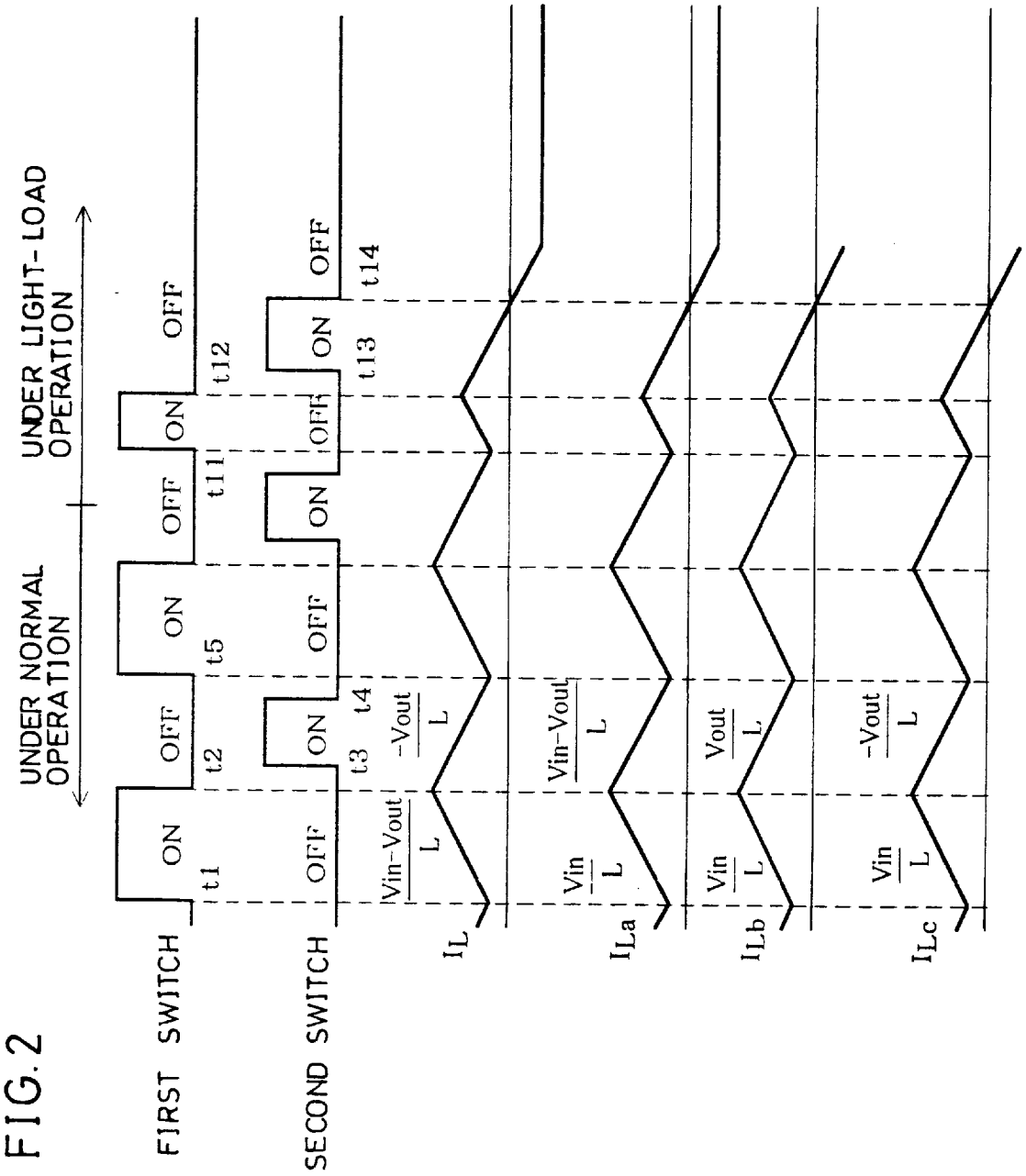
FIG. 2 is a waveform diagram showing an operation of the switching power circuit.

The following will describe one embodiment of the present invention referring to FIG. 1 and FIG. 2. A switching power circuit in accordance with the present embodiment is a DC/DC converter of a step-down type adopting the synchronous rectifier system, and is suitably adopted, for example, for generating a constant voltage of a desired value from a DC power source whose voltage fluctuates.

Specifically, as shown in FIG. 1, a switching power circuit 1 is provided with a series circuit composed of a first switch 11 and an inducing element 12 between an input terminal IN and an output terminal OUT. The junction of the inducing element 12 and the output terminal OUT is grounded via a smoothing capacitor 13, and the junction of the first switch 11 and the inducing element 12 is grounded via a commutating diode (rectifier element) 14 connected to a polarity for maintaining the current of the inducing element 12. There is also provided a second switch 15 parallel to the commutating diode 14.

The switching power circuit 1 is also provided with a control circuit 21 for controlling the conduction/cut-off state of the first and second switches 11 and 15. The first and second switches 11 and 15 are controlled in such a manner that their conduction periods do not overlap with each other. The control circuit 21 also controls the ratio of conduction period to cut-off period of the first switch 11 by monitoring an output voltage Vout of the output terminal OUT so as to make the output voltage Vout constant.

The switching power circuit 1 in accordance with the present embodiment is further provided with an inducing element current detecting circuit 22 for detecting the direction of a current at the junction of the inducing element 12 and the output terminal OUT. The inducing element current detecting circuit 22, for example, is a resistance connected in series to the inducing element 12, and in this case detects the direction of the current flowing through the inducing element 12 by comparing the potentials at the both terminals of the resistance. Note that, in the present embodiment, a resistance component of wiring is used as the resistance to prevent lowering of efficiency induced by a voltage drop of the resistance.

In the switching power circuit 1 having the described structure, as shown in FIG. 2, the control circuit 21 conducts the first switch 11 (at time t1) while the second switch 15 is being cut-off. In response to this, input voltage Vin applied to the input terminal IN is outputted to the output terminal OUT via the first switch 11 and the inducing element 12. Under this condition, current $I_L$ flowing through the inducing element 12 increases with the slope $dI_L/dt$ in the following Equation (1).

$$dI_L/dt=(Vin-Vout)/L \quad (1)$$

Note that, in Equation (1), the direction of the induction current $I_L$ is positive from the input terminal IN to the output terminal OUT, and "L" denotes the reactance of the inducing element 12. The input voltage Vin is applied to the input side of the inducing element 12 under this condition, and thus the polarity of the commutating diode 14 becomes opposite, and the commutating diode 14 is cut-off. Here, the second switch 15 is also cut-off.

At time t2, the first switch 11 is cut-off, and after predetermined dead time Tdet has elapsed, the control circuit 21 conducts the second switch 15 (at time t3). Then, after predetermined dead time Tdet has elapsed from the time the second switch 15 is cut-off at time t4, the control circuit 21 conducts the first switch 11 (time t5). In this manner, in the control circuit 21, predetermined dead time Tdet is provided between the time when the first switch 11 is cut-off and the second switch 15 is conducted, and also between the time when the second switch 15 is cut-off and the first switch 11 is conducted. Therefore, a feedthrough current, which flows when the first switch 11 and the second switch 15 are conducted simultaneously, does not generate.

Here, the current $I_L$ which flows through the inducing element 12 is maintained by the commutating diode 14 and the second switch 15 while the first switch 11 is being cut-off (period between t2 and t5), and the slope $dI_L/dt$ of the current $I_L$ is given by the following Equation (2).

$$dI_L/dt = -(Vout/L) \qquad (2)$$

Also, in a period between t2 and t5, from t3 to t4, the second switch 15 is being conducted and the current $I_L$ flows through the second switch 15, not the commutating diode 14. Thus, in a period while the second switch 15 is being conducted, a forward voltage-induced loss of the commutating diode 14 does not generate. As a result, even when output load current Iout and the current $I_L$ flowing through the inducing element 12 are both large, the conversion efficiency of the switching power circuit 1 is maintained at a high value of, for example, not less than 80 percent.

In this manner, the energy stored in the form of induction current $I_L$ in the inducing element 12 while the first switch 11 is being conducted is released while the first switch 11 is being cut-off, and is outputted from the output terminal OUT after being smoothed by the smoothing capacitor 13. Here, the control circuit 21 feedback-controls the ratio of conduction period to cut-off period of the first switch 11 by monitoring the output voltage Vout so as to make the output voltage Vout constant, thus allowing the switching power circuit 1 to continuously output a voltage having a constant value, regardless of a change in load.

For example, when the output voltage Vout is expected to be smaller than a predetermined value Vcon as a result of an increase in output load current Iout, the control circuit 21 extends the conduction period of the first switch 11. On the other hand, when the output voltage Vout is expected to exceed the predetermined value Vcon as a result of a decrease in output load current Iout, the conduction period of the first switch 11 is shortened.

Here, as indicated by Equation (2), the current $I_L$ flowing through the inducing element 12 continues to decrease while the first switch 11 is being cut-off, and for this reason the induction current $_L$ approaches zero as the non-conduction period of the first switch 11 becomes longer. Therefore, if the second switch 15 is kept conducted (after time t11) when the cut-off period of the first switch 11 is excessively long, as in the case where the output load current Iout is excessively small, there is a case that the induction current $I_L$ is reduced to zero or less and the direction of the induction current $I_L$ is reversed. In such a case, the current flows to GND from the output terminal OUT via the inducing element 12 and the second switch 15, and as a result the conversion efficiency of the switching power circuit 1 is reduced to 50 percent or less.

However, in the present embodiment, the inducing element current detecting circuit 22 monitors the direction of the induction current $I_L$ all the time, and just as the direction of the induction current $I_L$ starts being reversed (at time t14) as the forward current of the inducing element 12 approaches zero, the inducing element current detecting circuit 22 sends a signal for cutting off the second switch 15 to the control circuit 21. The control circuit 21, upon receiving the signal, cuts off the second switch 15 regardless of whether the first switch 11 is being conducted or cut-off. As a result, the reverse current does not flow through the inducing element 12 even when output load is small, thus maintaining high conversion efficiency even with a small output load. As a result, it is possible to realize switching power circuit 1 of a step-down type capable of always maintaining high conversion efficiency of, for example, not less than 80 percent.

The above First Embodiment described the switching power circuit 1 of a step-down type. However, not limiting to this, the present invention is also applicable to a switching power circuit of other types. The present embodiment will describe the case where a step-up type is adopted as an example of such a switching power circuit.

Figure 3:
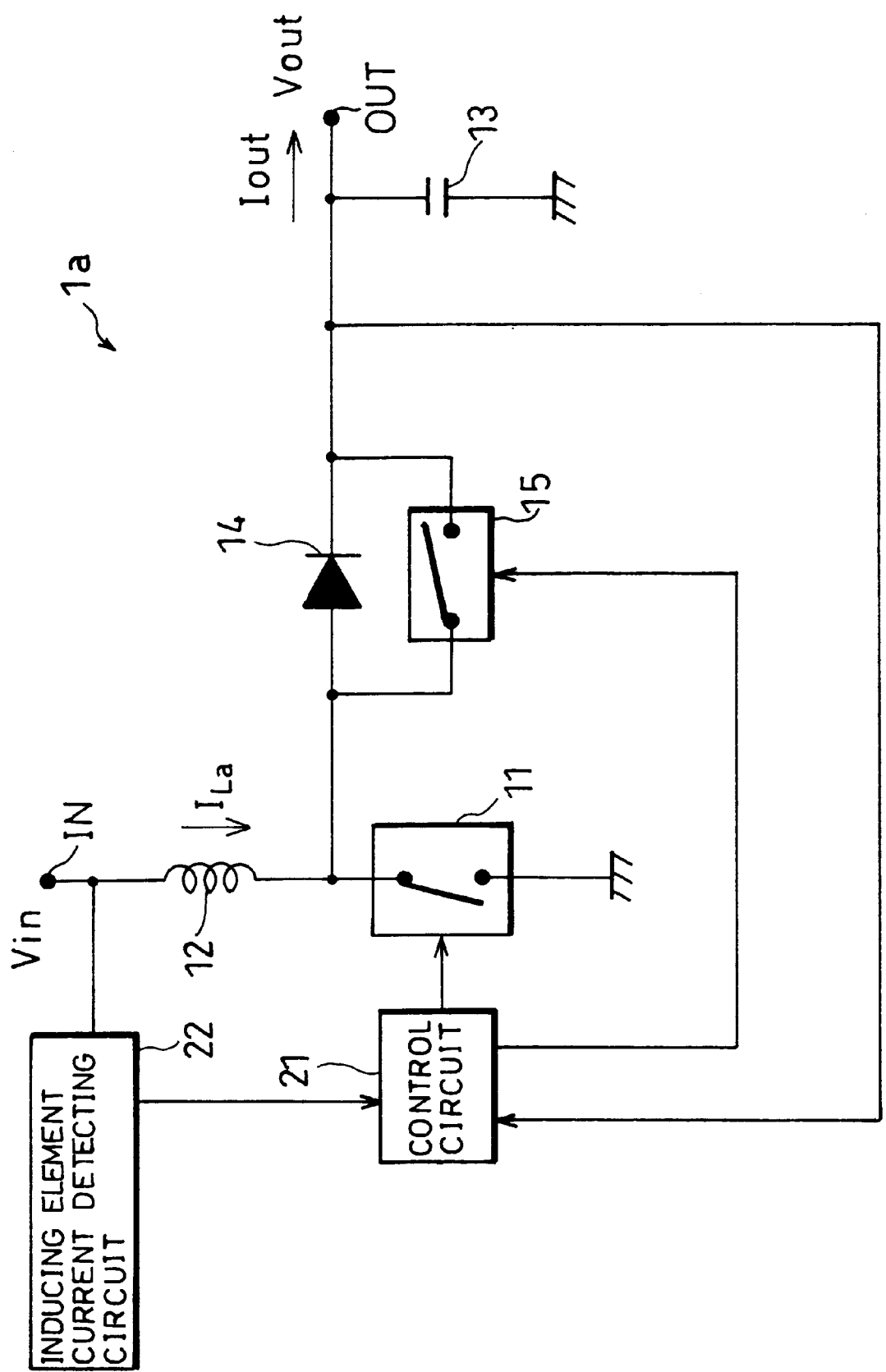
FIG. 3 is a block diagram, which indicates a Second Embodiment of the present invention, showing a main component of a switching power circuit of a step-up type adopting the synchronous rectification system.

As shown in FIG. 3, in a switching power circuit 1a of a step-up type, one terminal of an inducing element 12 is connected to an input terminal IN, and the other terminal is grounded via a first switch 11. The junction of the inducing element 12 and the first switch 11 is connected to an output terminal OUT via a parallel circuit composed of a commutating diode 14 and a second switch 15. The polarity of the commutating diode 14 is set in a direction for maintaining current $I_{La}$ of the inducing element 12, that is, in a direction from the inducing element 12 to the output terminal OUT. Between the output terminal OUT and GND is provided a smoothing capacitor 13. An inducing element current detecting circuit 22 in accordance with the present embodiment monitors the current $I_{La}$ at the junction of the inducing element 12 and the input terminal IN. As a result, a control circuit 21 in accordance with the present embodiment, as with that of the First Embodiment, is capable of adjusting the ratio of conduction period to cut-off period of the first switch 11 in accordance with output voltage Vout and controlling the first and second switches 11 and 15 so that their conduction periods do not overlap with each other, and also capable of cutting off the second switch 15 when the forward current of the inducing element 12 approaches zero and the reverse current is expected to flow.

In this structure, as shown in FIG. 2, the induction current $I_{La}$ is increased while the first switch 11 is being conducted (period between t1 and t2), and is reduced while the first switch 11 is being cut-off (period between t2 and t5). Here, the slopes $dI_{La}/dt$ when the induction current $I_{La}$ is increased and decreased are represented by the following Equations (3) and (4), respectively.

$$dI_{La}/dt = Vin/L \qquad (3)$$

$$dI_{La}/dt = (Vin-Vout)/L \qquad (4)$$

In the above structure, the energy stored in the inducing element 12 in the conduction period of the first switch 11 is superimposed on the input voltage Vin in the cut-off period of the first switch 11 so as to be outputted. This allows the switching power circuit 1a to supply output voltage Vout larger than input voltage Vin to a load. Also, as with the First Embodiment, by feedback-controlling the ratio of conduction period to cut-off period of the first switch 11 in accordance with the output voltage Vout, it is possible to maintain the output voltage Vout at a constant value of Vcon.

Also, in the above structure, as indicated by Equation (4), the current $I_{La}$ flowing through the inducing element 12 continues to decrease while the first switch 11 is being cut-off. Thus, in the case where the cut-off period of the first switch 11 is excessively long, as with the First Embodiment, if the second switch 15 is kept conducted (after time t11), there is a case that the induction current $I_{La}$ is reduced to zero or less and the direction of the induction current $I_{La}$ is reversed. In such a case, the current flows to the input terminal IN from the output terminal OUT via the second switch 15 and the inducing element 12, and as a result the conversion efficiency of the switching power circuit 1a is reduced to 50 percent or less.

However, in the present embodiment, the inducing element current detecting circuit 22 monitors the direction of the induction current $I_{La}$ all the time, and just as the direction of the induction current $I_{La}$ starts being reversed (at time t14) as the forward current of the inducing element 12 approaches zero, the inducing element current detecting circuit 22 sends a signal for cutting off the second switch 15 to the control circuit 21. The control circuit 21, upon receiving the signal, cuts off the second switch 15 regardless of whether the first switch 11 is being conducted or cut-off. As a result, the reverse current does not flow through the inducing element 12 even when output load is small, thus maintaining high conversion efficiency even with a small output load. As a result, it is possible to realize switching power circuit 1a of a step-up type capable of always maintaining high conversion efficiency of, for example, not less than 80 percent.

Figure 4:
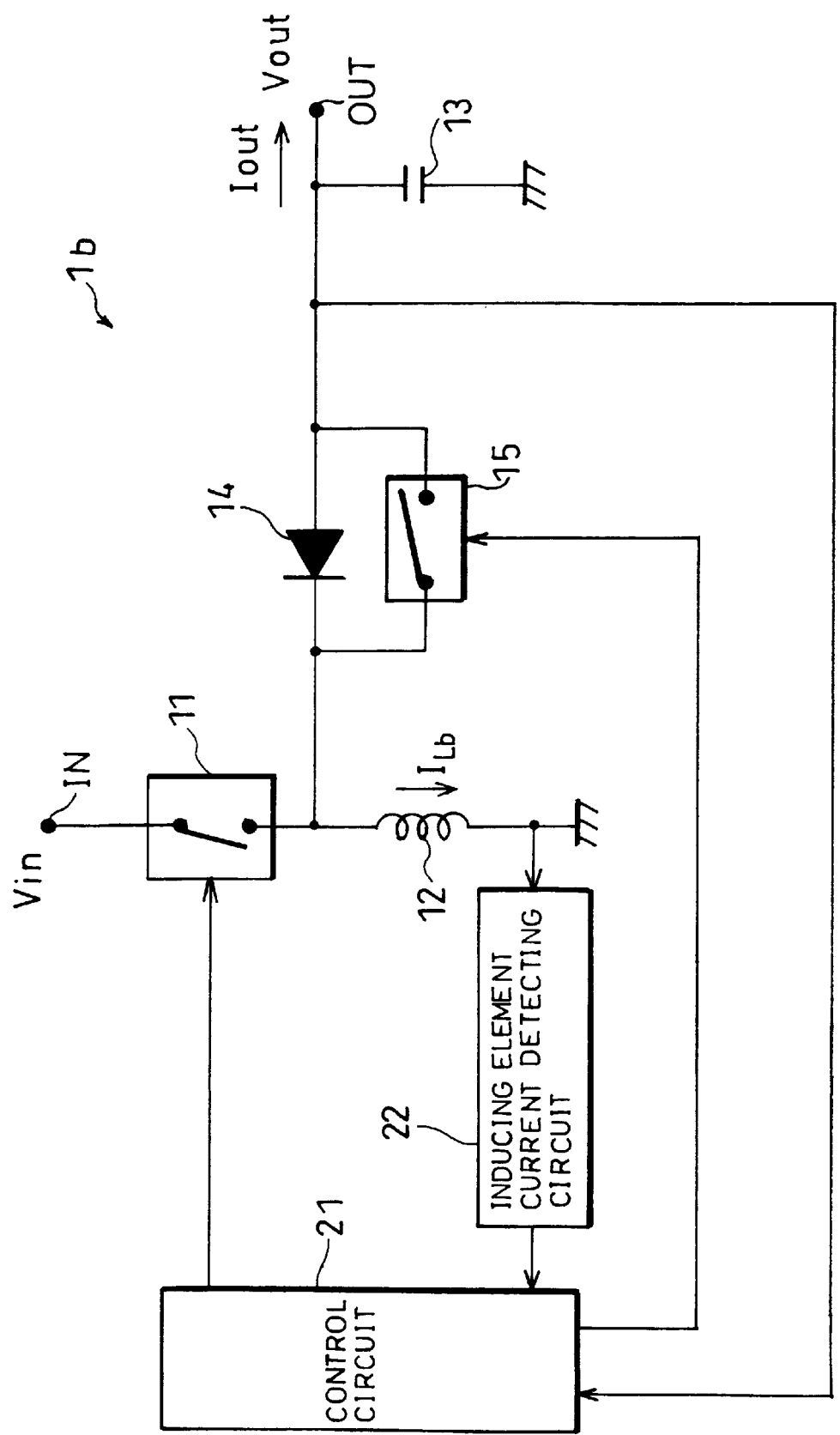
FIG. 4 is a block diagram, which indicates a Third Embodiment of the present invention, showing a main component of a switching power circuit of a reversed type adopting the synchronous rectification system.

The third embodiment describes, referring to FIG. 2 and FIG. 4, the case where a reversed type is adopted as an application example of the switching power circuit. As shown in FIG. 4, in a switching power circuit 1b of a reversed type, one terminal of an inducing element 12 is grounded, and the other terminal is connected to an input terminal IN via a first switch 11. The junction of the inducing element 12 and the first switch 11 is connected to an output terminal OUT via a parallel circuit composed of a commutating diode 14 and a second switch 15. The polarity of the commutating diode 14 is set in a direction for maintaining current $I_{Lb}$ of the inducing element 12, that is, in a direction from the output terminal OUT to the inducing element 12. Between the output terminal OUT and GND is provided a smoothing capacitor 13. An inducing element current detecting circuit 22 in accordance with the present embodiment monitors the current $I_{Lb}$ flowing into the GND from the inducing element 12. As a result, a control circuit 21 in accordance with the present embodiment, as with that of the First Embodiment, is capable of adjusting the ratio of conduction period to cut-off period of the first switch 11 in accordance with output voltage Vout and controlling the first and second switches 11 and 15 so that their conduction periods do not overlap with each other, and also capable of cutting off the second switch 15 when the forward current of the inducing element 12 approaches zero and the reverse current is expected to flow.

In this structure, as shown in FIG. 2, the induction current $I_{Lb}$ is increased while the first switch 11 is being conducted (period between t1 and t2), and is reduced while the first switch 11 is being cut-off (period between t2 and t5). Here, the slopes $dI_{Lb}/dt$ when the induction current $I_{Lb}$ is increased and decreased are represented by the following Equations (5) and (6), respectively.

$$dI_{Lb}/dt = Vin/L \tag{5}$$

$$dI_{Lb}/dt = Vout/L \tag{6}$$

In the above structure, the energy stored in the inducing element 12 in the conduction period of the first switch 11 is outputted with the opposite polarity to that of the input voltage Vin in the cut-off period of the first switch 11. As a result, output voltage Vout having the opposite polarity to that of the input voltage Vin is supplied to the load. Also, as with the First Embodiment, by feedback-controlling the ratio of conduction period to cut-off period of the first switch 11 in accordance with the output voltage Vout, it is possible to maintain the output voltage Vout at a constant value of Vcon.

Also, in the above structure, as indicated by Equation (5), the current $I_{Lb}$ flowing through the inducing element 12 continues to decrease while the first switch 11 is being cut-off. However, as with the First Embodiment, the inducing element current detecting circuit 22 monitors the direction of the induction current $I_{Lb}$ all the time, and just as the direction of the induction current $I_{Lb}$ starts being reversed (at time t14) as the forward current of the inducing element 12 approaches zero, the control circuit 21 cuts off the second switch 15 in accordance with an instruction from the inducing element current detecting circuit 22. As a result, the reverse current does not flow through the inducing element 12 even when output load is small, thus maintaining high conversion efficiency even with a small output load. As a result, it is possible to realize switching power circuit 1b of a reversed type capable of always maintaining high conversion efficiency of, for example, not less than 80 percent.

Figure 5:
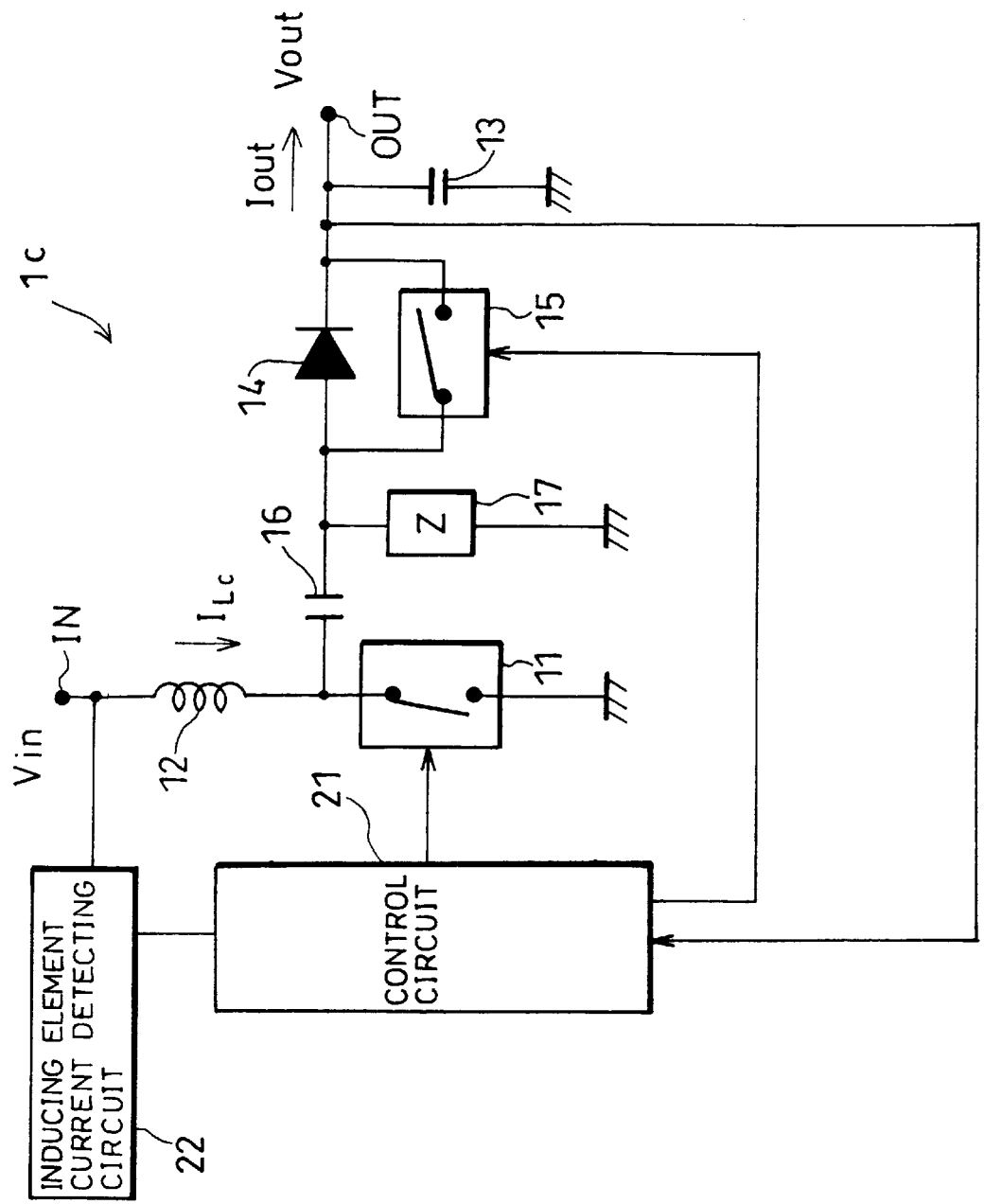
FIG. 5 is a block diagram, which indicates a Fourth Embodiment of the present invention, showing a main component of a switching power circuit of an up-down type adopting the synchronous rectification system.

The fourth embodiment describes, referring to FIG. 2 and FIG. 5, the case where an up-down type is adopted as an application example of the switching power circuit. As shown in FIG. 5, in a switching power circuit 1c of an up-down type, though the structure is substantially the same as that of the switching power circuit 1a of FIG. 3, a capacitor 16 is provided between (i) the junction of an inducing element 12 and a first switch 11 and (ii) a commutating diode 14, and the junction of the capacitor 16 and the commutating diode 14 is grounded via a short-circuiting inducing element or a short-circuiting resistance of an impedance element ("Z" in FIG. 5) 17. The other structure is the same as that of the switching power circuit 1a, and members having the same functions are given the same reference numerals and explanations thereof are omitted here.

In this structure, as shown in FIG. 2, induction current $I_{Lc}$ flowing through the inducing element 12 is increased while the first switch 11 is being conducted (period between t1 and t2), and is reduced while the first switch 11 is being cut-off (period between t2 and t5). Here, the slopes $dI_{Lc}/dt$ when the induction current $I_{Lc}$ is increased and decreased are represented by the following Equations (7) and (8), respectively.

$$dI_{Lc}/dt = Vin/L \tag{7}$$

$$dI_{Lc}/dt = -(Vout/L) \tag{8}$$

In the above structure, the energy stored in the inducing element 12 in the conduction period of the first switch 11 is outputted via the capacitor 16 in the cut-off period of the first switch 11. Thus, as with the First Embodiment, by feedback-controlling the ratio of conduction period to cut-off period of the first switch 11 in accordance with the output voltage Vout, it is possible to maintain the output voltage Vout at a constant value of Vcon. In the present embodiment, by the capacitor 16 and the impedance element 17, a phase difference is generated between the current $I_{Lc}$ flowing through the inducing element 12 and output load current Iout. As a result, regardless of whether the input voltage Vin is larger or smaller than the output voltage Vout, it is possible to realize switching power circuit 1c of an up-down type capable of maintaining the output voltage Vout at a constant value of Vcon.

Also, in the above structure, as indicated by Equation (7), the current $I_{Lc}$ flowing through the inducing element 12 continues to decrease while the first switch 11 is being cut-off. However, as with the First Embodiment, the inducing element current detecting circuit 22 monitors the direction of the induction current $I_{Lc}$ all the time, and just as the direction of the induction current $I_{Lc}$ starts being reversed (at time t14) as the forward current of the inducing element 12 approaches zero, the control circuit 21 cuts off the second switch 15 in accordance with an instruction from the inducing element current detecting circuit 22. As a result, the reverse current does not flow through the inducing element 12 even when output load is small, thus maintaining high conversion efficiency even with a small output load. As a result, it is possible to realize switching power circuit 1c of an up-down type capable of always maintaining high conversion efficiency of, for example, not less than 80 percent.

In First through Fourth Embodiments, the second switch 15 is cut-off by directly detecting the direction of a current flow through the inducing element 12 using the inducing element current detecting circuit 22. The inducing element current detecting circuit 22 detects the current direction, for example, by measuring a voltage between terminals of a resistance connected in series to the inducing element 12, or by measuring the strength of a magnetic field using Hall elements.

However, it is difficult to integrate elements for measuring a magnetic field, and as a result the size of the switching power circuit tend to be large. Meanwhile, when carrying out detection using a resistance, there is a case where the efficiency of the entire switching power circuit is lowered as a result of a voltage drop of the resistance. Such reduction of efficiency can be reduced when the resistance component of wiring is used as the measuring resistance. Also, when the resistivity is reduced, the resistance-induced loss can be prevented. Nevertheless, in either case, the resistivity of a measuring resistance becomes small, and as a result the accuracy and gain required for measuring the current direction are increased excessively. Meanwhile, because the switching frequency of the first switch 11 is being increased year to year to improve the conversion efficiency, ever faster detecting speed is required. Accordingly, it is required to provide the inducing element current detecting circuit 22, which satisfies predetermined levels of both measuring accuracy and operation speed, and as a result it is difficult to realize a compact switching power circuit with a small loss.

As a countermeasure against this problem, the following describes a structure wherein the second switch 15 is cut-off in accordance with the input voltage Vin and the output voltage Vout by predicting the time at which the direction of the current flow through the inducing element 12 is reversed.

Figure 6:
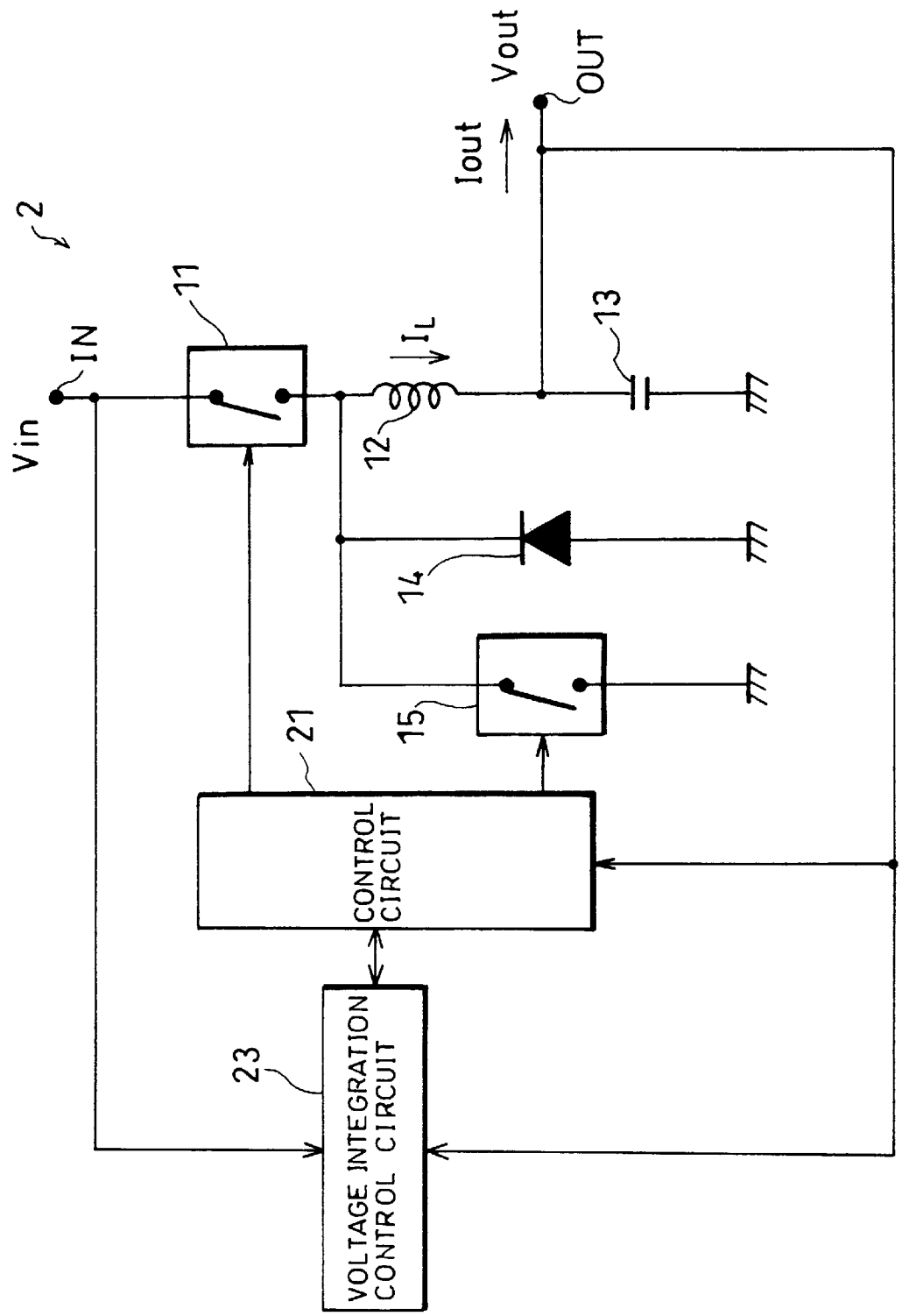
FIG. 6 is a block diagram, which indicates a Fifth Embodiment of the present invention, showing a main component of a switching power circuit of a step-down type adopting the synchronous rectification system.

A switching power circuit 2 as shown in FIG. 6 is a switching power circuit of a step-down type, and has substantially the same structure as that of the switching power circuit 1 of FIG. 1, except for a voltage integration control circuit 23, which is provided instead of the inducing element current detecting circuit 22. Note that, in the following embodiments, the voltage integration control circuit 23 and the control circuit 21 constitute a controller.

The voltage integration control circuit 23 calculates current $I_L$ flowing through the inducing element 12 by detecting the input voltage Vin and the output voltage Vout, and sends a signal for cutting off the second switch 15 to the control circuit 21 at a timing when the current $I_L$ is reversed. Specifically, when the voltage between both terminals of the first switch 11 and of the second switch 15 when they are being conducted is 0 V, and when the conduction period of the first switch 11 is $T_{ON}$, the time x it takes until the energy stored in the inducing element 12 in the conduction period of the first switch 11 is released is determined by the following Equation (9), using Equations (1) and (2).

$$x = T_{ON} \cdot (Vin - Vout)/Vout \qquad (9)$$

Thus, when the voltage integration control circuit 23 calculates time x, and when the control circuit 21 cuts off the second switch 15 before time x elapses from the time the first switch 11 is cut-off, the reverse current does not flow through the inducing element 12. In the case where the conduction/cut-off state of the first switch 11 can be controlled by controlling the second switch 15, for example, as in the case where the period between cut-off of the second switch 15 and conduction of the first switch 11 is decided, the reverse current flow can also be prevented by controlling the conduction/cut-off state of the second switch 15 in such a manner that the cut-off period $T_{OFF}$ of the first switch 11 is shorter than time x.

Note that, when the second switch 15 is cut-off before the reverse current starts to flow, the forward current flows via the commutating diode 14. As a result, a forward current loss due to the commutating diode 14 is generated until the current $I_L$ becomes zero, and the efficiency of the switching power circuit 2 is lowered. On the other hand, when the second switch 15 is cut-off after the reverse current has started to flow, the reverse current flows until the second switch 15 is cut-off, and as a result a reverse current-induced loss is generated. Therefore, it is most preferable to control the time the second switch 15 is cut-off so that the cut-off time coincides with the time the reverse current starts to flow. However, it should be noted here that because the reverse current-induced loss is larger than the forward voltage-induced loss of the commutating diode 14, in the case where the time the reverse current starts to flow cannot be predicted accurately, it is preferable to carry out a control by cutting off the second switch 15 in advance so that the reverse current does not flow.

This ensures that the reverse current is prevented without requiring a direct measurement of the induction current $I_L$. As a result, as with the First Embodiment, it is possible to realize switching power circuit 2 of a step-down type capable of maintaining conversion efficiency even when the output load is small, and also capable of always maintaining high conversion efficiency of, for example, not less than 80 percent.

The voltage integration control circuit 23 in accordance with the present embodiment decides the cut-off timing of the second switch 15 in accordance with the input voltage Vin and the output voltage Vout, allowing the cut-off timing to be decided without providing a resistance in series to the inducing element 12. As a result, compared with the switching power circuit 1 of the First Embodiment, that is, compared with the case where the cut-off timing is decided by the inducing element current detecting circuit 22, it is possible to realize with relative ease a compact switching power circuit with a small loss.

Figure 7:
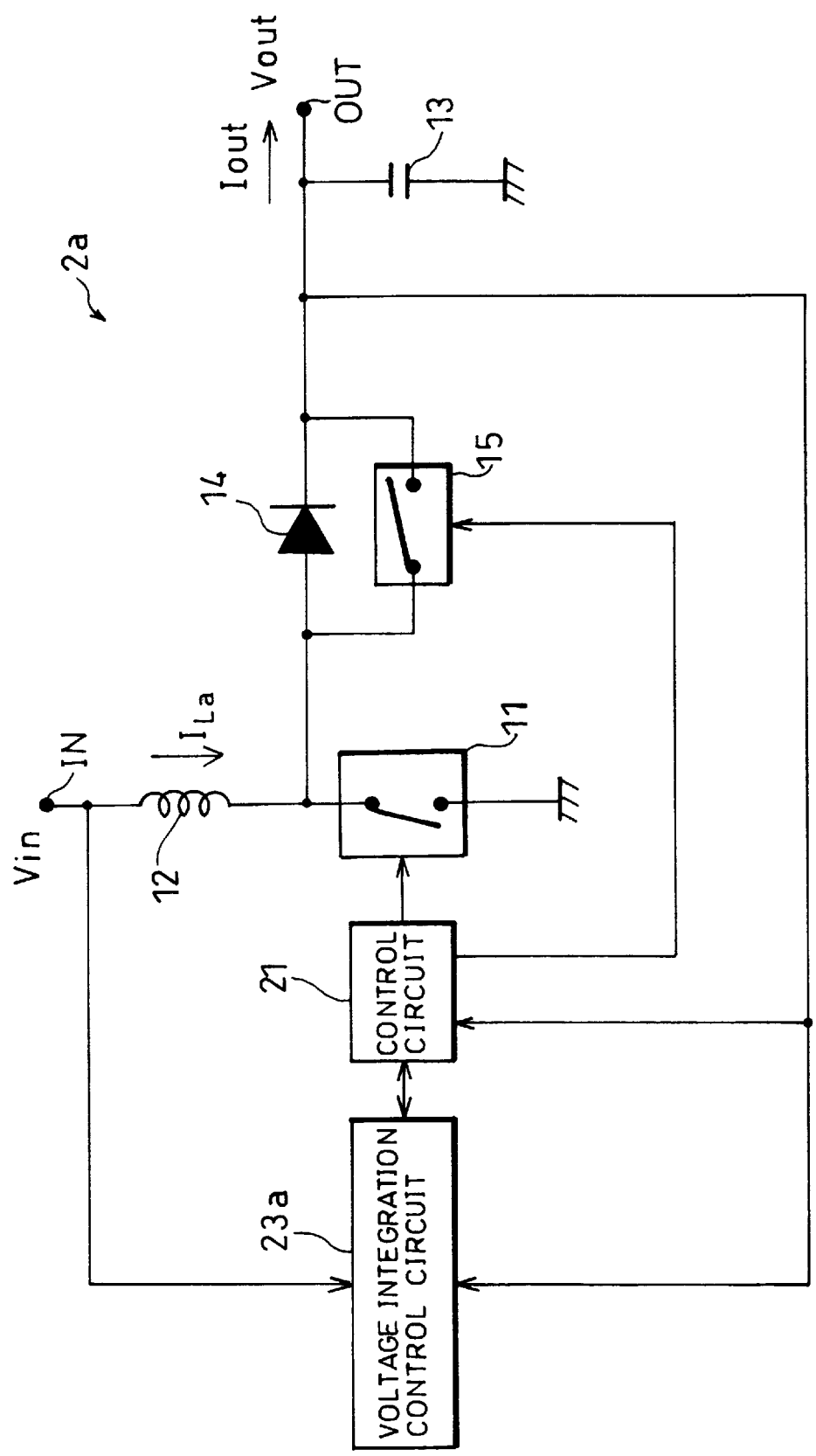
FIG. 7 is a block diagram, which indicates a Sixth Embodiment of the present invention, showing a main component of a switching power circuit of a step-up type adopting the synchronous rectification system.

The fifth Embodiment described the case where the voltage integration control circuit is provided in the switching power circuit of a step-down type. However, not limited to this, the present invention is also applicable to a switching power circuit of other types. For example, when a voltage integration control circuit 23a, instead of the inducing element current detecting circuit 22, is provided in the switching power circuit 1a of a step-up type as shown in FIG. 3, a switching power circuit 2a of FIG. 7 is obtained.

In a structure of the switching power circuit 2a, the induction current $I_{La}$ in the conduction period of the first switch 11 is changed in accordance with Equations (3) and (4), and the time $x_a$ it takes until the energy stored in the inducing element 12 in the conduction period of the first switch 11 is released is determined by the following Equation (10).

$$x_a = T_{ON} \cdot \text{Vin}/(\text{Vout} - \text{Vin}) \tag{10}$$

Thus, as with the Fifth Embodiment, when the voltage integration control circuit 23a calculates time $x_a$, and when the control circuit 21 cuts off the second switch 15 before time $x_a$ elapses from the time the first switch 11 is cut-off, the reverse current does not flow through the inducing element 12. The reverse current flow can also be prevented by controlling the conduction/cut-off state of the second switch 15 in such a manner that the cut-off period $T_{OFF}$ of the first switch 11 is shorter than time $x_a$.

As a result, as with the Second Embodiment, it is possible to realize switching power circuit 2a of a step-up type capable of maintaining conversion efficiency even when the output load is small, and also capable of always maintaining high conversion efficiency of, for example, not less than 80 percent. Also, in the present embodiment, as with the Fifth Embodiment, the cut-off time of the second switch 15 is decided without directly measuring the induction current $I_{La}$. Therefore, it is possible to realize with relative ease switching power circuit 2a which is more compact and more efficient than that of the Second Embodiment.

Figure 8:
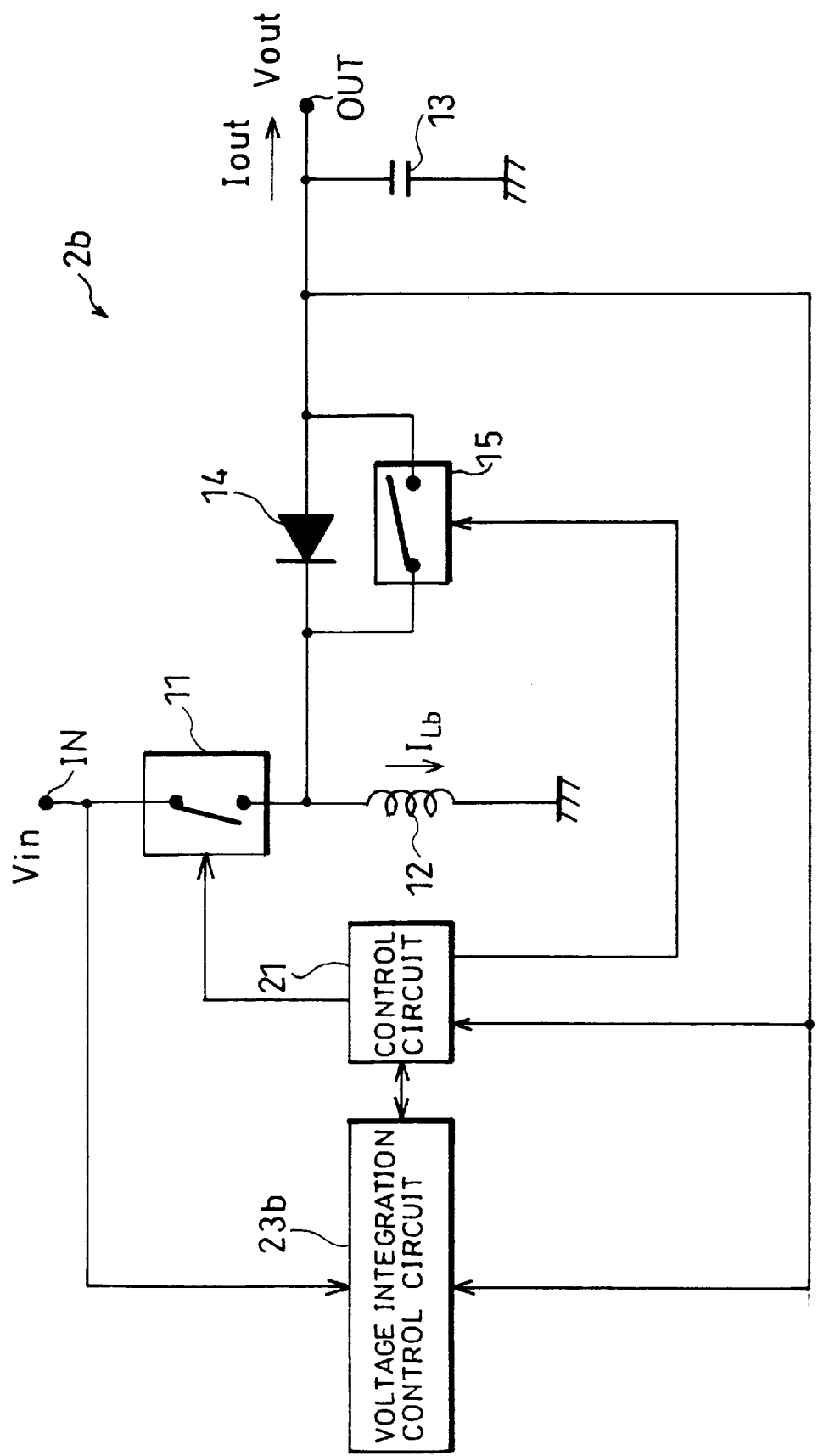
FIG. 8 is a block diagram, which indicates a Seventh Embodiment of the present invention, showing a main component of a switching power circuit of a reversed type adopting the synchronous rectification system.

When a voltage integration control circuit 23b, instead of the inducing element current detecting circuit 22, is provided in the switching power circuit 1b of a reversed type of FIG. 4, a switching power circuit 2b of FIG. 8 is obtained.

In a structure of the switching power circuit 2b, the induction current $I_{Lb}$ in the conduction period of the first switch 11 is changed in accordance with Equations (5) and (6), and the time $xb$ it takes until the energy stored in the inducing element 12 in the conduction period of the first switch 11 is released is determined by the following Equation (11).

$$x_b = T_{ON} \cdot \text{Vin}/(-\text{Vout}) \tag{11}$$

Thus, as with the Fifth Embodiment, when the voltage integration control circuit 23b calculates time $x_b$, and when the control circuit 21 cuts off the second switch 15 before time $xb$ elapses from the time the first switch 11 is cut-off, the reverse current does not flow through the inducing element 12. The reverse current flow can also be prevented by controlling the conduction/cut-off state of the second switch 15 in such a manner that the cut-off period $T_{OFF}$ of the first switch 11 is shorter than time $x_b$. As a result, as with the Third Embodiment, it is possible to realize switching power circuit 2b of a reversed type capable of maintaining conversion efficiency even when the output load is small, and also capable of always maintaining high conversion efficiency of, for example, not less than 80 percent. Also, in the present embodiment, as with the Fifth Embodiment, the cut-off time of the second switch 15 is decided without directly measuring the induction current $I_{Lb}$. Therefore, it is possible to realize with relative ease switching power circuit 2b which is more compact and more efficient than that of the Third Embodiment.

Figure 9:
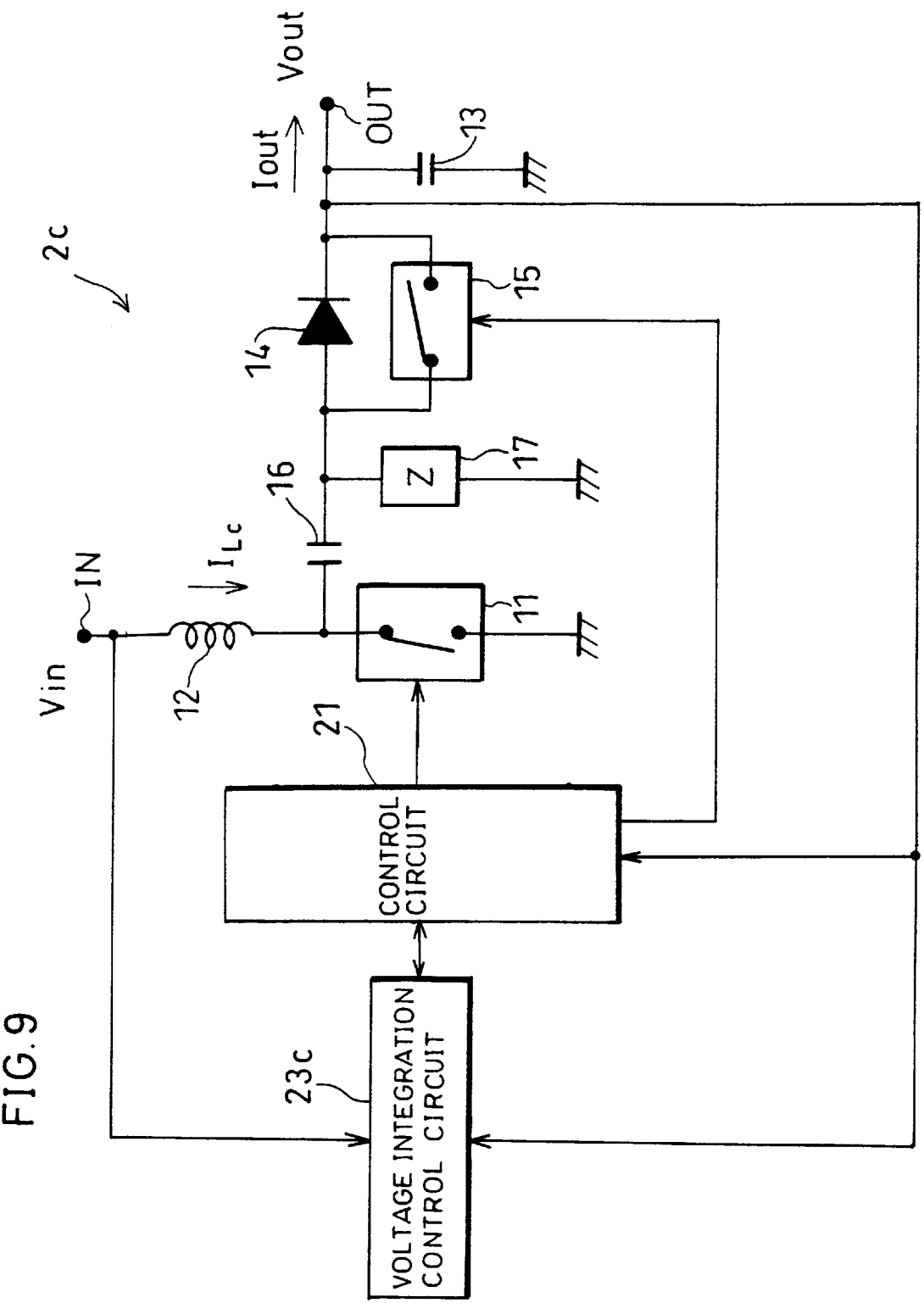
FIG. 9 is a block diagram, which indicates a Eighth Embodiment of the present invention, showing a main component of a switching power circuit of an up-down type adopting the synchronous rectification system.

When a voltage integration control circuit 23c, instead of the inducing element current detecting circuit 22, is provided in the switching power circuit 1c of an up-down type of FIG. 5, a switching power circuit 2c of FIG. 9 is obtained.

In a structure of the switching power circuit 2c, the induction current $I_{Lc}$ in the conduction period of the first switch 11 is changed in accordance with Equations (7) and (8), and the time $x_c$ it takes until the energy stored in the inducing element 12 in the conduction period of the first switch 11 is released is determined by the following Equation (12).

$$x_c = T_{ON} \cdot \text{Vin}/\text{Vout} \tag{12}$$

Thus, as with the Fifth Embodiment, when the voltage integration control circuit 23c calculates time $x_c$, and when the control circuit 21 cuts off the second switch 15 before time $x_c$ elapses from the time the first switch 11 is cut-off, the reverse current does not flow through the inducing element 12. The reverse current flow can also be prevented by controlling the conduction/cut-off state of the second switch 15 in such a manner that the cut-off period $T_{OFF}$ of the first switch 11 is shorter than time $x_c$.

As a result, as with the Fourth Embodiment, it is possible to realize switching power circuit 2c of an up-down type capable of maintaining conversion efficiency even when the output load is small, and also capable of always maintaining high conversion efficiency of, for example, not less than 80 percent. Also, in the present embodiment, as with the Fifth Embodiment, the cut-off time of the second switch 15 is decided without directly measuring the induction current $I_{Lc}$. Therefore, it is possible to realize with relative ease switching power circuit 2c which is more compact and more efficient than that of the Fourth Embodiment.

The voltage integration control circuit 23 in accordance with each of the Fifth through Eighth Embodiments may be realized, for example, by a digital circuit or by an analog circuit. Also, the time the reverse current starts to flow may be predicted in accordance with the input voltage Vin and the output voltage Vout at a particular instant by simplifying the Equations (9) to (12).

However, when Equations (9) to (12) are applied to a digital circuit, the size of the circuit and the power consumption tend to be large compared with the case of the analog circuit. Meanwhile, as described, when the time the reverse current actually starts to flow is shifted from the time predicted, the conversion efficiency of the switching power circuit is lowered, and for this reason when approximate expression is used to make a prediction, it is difficult to improve the conversion efficiency of the switching power circuit.

Figure 10:
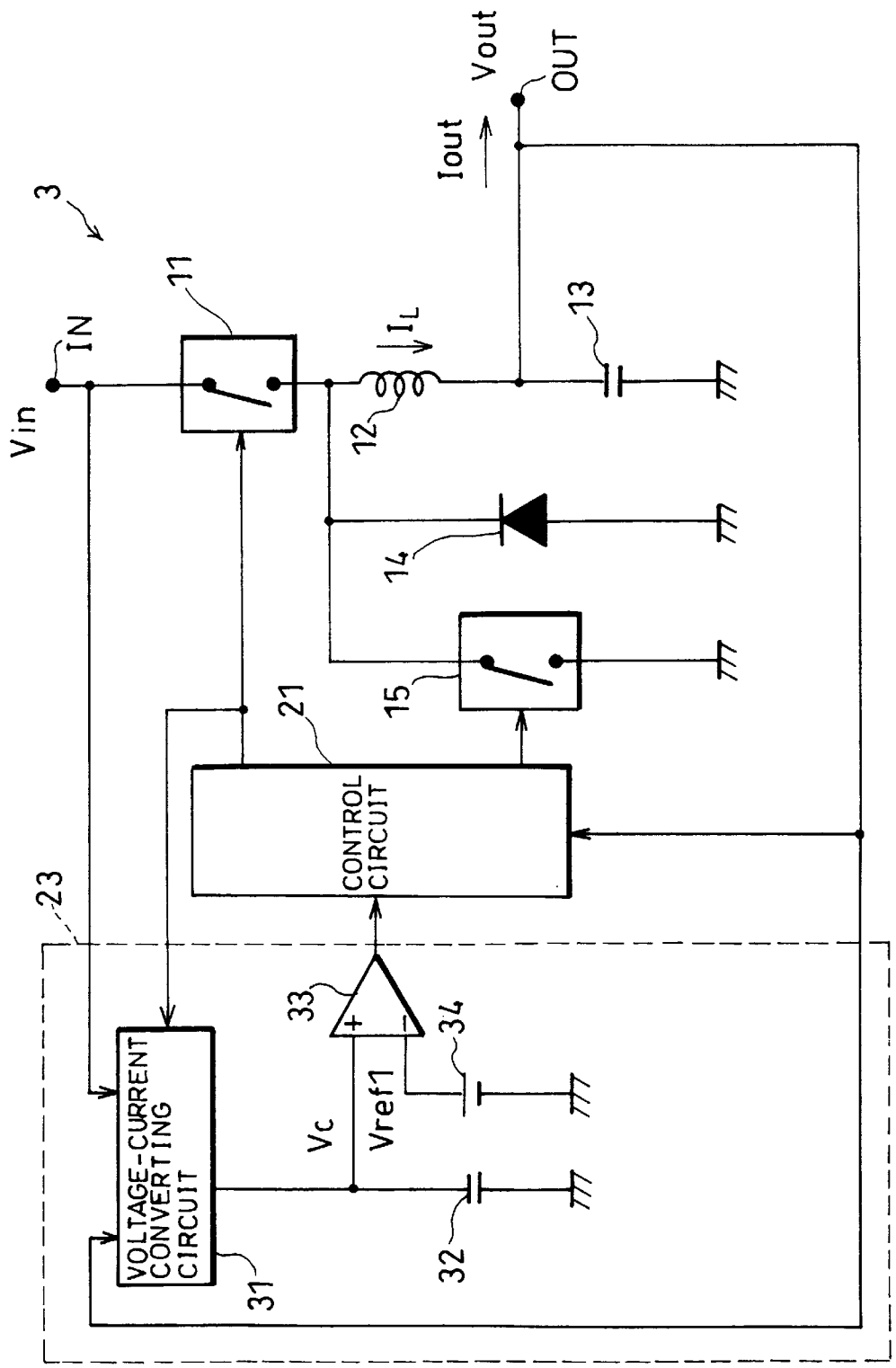
FIG. 10 is a block diagram, which indicates a Ninth Embodiment of the present invention, showing a main component of a switching power circuit of a step-down type adopting the synchronous rectification system.

The following will describe the case where an analog integrator is adopted as an example of a preferable structure of the voltage integration control circuit 23. Specifically, a switching power circuit 3 in accordance with the present embodiment is a step-down circuit, and as shown in FIG. 10, the voltage integration control circuit 23 is provided with (a) a voltage-current converting circuit (voltage-current converting section) 31 for generating a current in accordance with the amount of change $dI_L/dt$ of the induction current $I_L$ by detecting and converting the input voltage Vin and the output voltage Vout to a current, either directly or after subjecting the detected voltages to an addition-subtraction process, (b) a current-voltage converting capacitor (storage capacitor) 32 for storing and converting the output current of the voltage-current converting circuit 31 to a voltage, (c) a comparator (control section) 33 for comparing output voltage Vc of the current-voltage converting capacitor 32 with a reference voltage Vref1 of a predetermined value, and (d) a power source 34 for generating and inputting the reference voltage Vref1 to the comparator 33. Note that, the other structure is the same as that of FIG. 6, and members having the same functions are given the same reference numerals and explanations thereof are omitted here.

The voltage-current converting circuit 31 generates a current proportional to Vin−Vout in accordance with the input voltage Vin and the output voltage Vout while the first switch 11 is being conducted, and sends the current generated to the current-voltage converting capacitor 32. Also, the voltage-current converting circuit 31 draws a current proportional to the output voltage Vout from the current-voltage converting capacitor 32 while the first switch 11 is being cut-off. Note that, the proportional constant when generating the current is the same in the conduction period and in the cut-off period.

Figure 11:
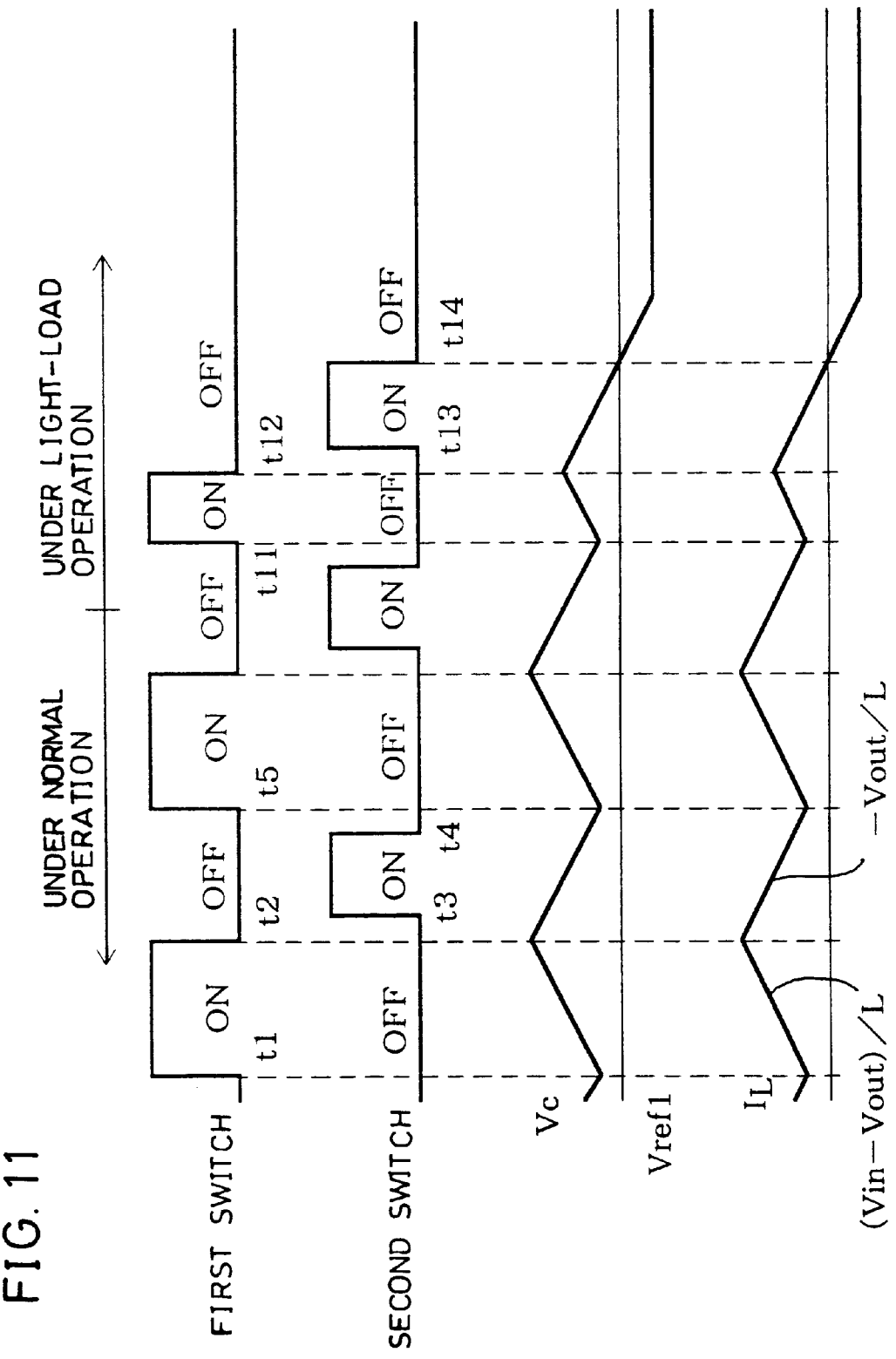
FIG. 11 is a waveform diagram showing an operation of the switching power circuit.

As a result, as shown in FIG. 11, the voltage Vc at the both terminals of the current-voltage converting capacitor 32 is changed in proportion to the forward current $I_L$ flowing through the inducing element 12. Thus, it is possible to accurately detect, as the time the voltage Vc becomes 0V, the time the reverse current starts to flow through the inducing element 12. Thus, when the comparator 33 compares the voltage Vc and the reference voltage Vref1, and instructs the control circuit 21 to cut-off the second switch 15 before the voltage Vc becomes 0V, the second switch 15 is cut-off before the reverse current flows through the inducing element 12. As a result, the reverse current does not flow through the inducing element 12 even when the output load is small, and it is possible to realize switching power circuit 3 of a step-down type capable of always maintaining high conversion efficiency of, for example, not less than 80 percent.

Figure 12:
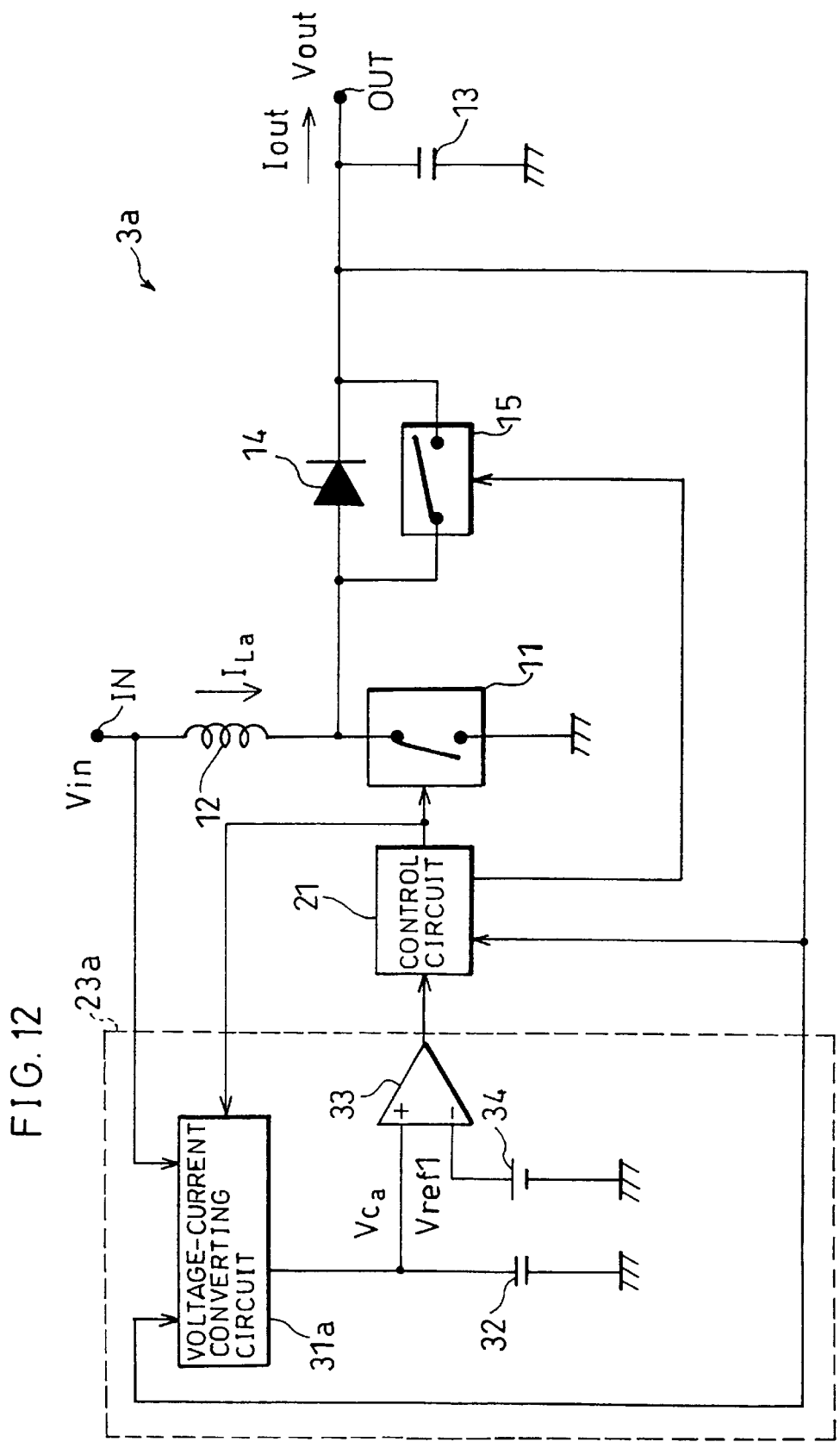
FIG. 12 is a block diagram, which indicates a Tenth Embodiment of the present invention, showing a main component of a switching power circuit of a step-up type adopting the synchronous rectification system.

The tenth embodiment will describe the case, referring to FIG. 12, wherein the voltage integral control circuit 23a is structured by adopting an analog integrator in a switching power circuit 3a of a step-up type, similar to the one shown in FIG. 7.

The voltage integral control circuit 23a in accordance with the present embodiment is substantially the same as the voltage integral control circuit 23 of FIG. 10, except for a voltage-current converting circuit 31a for calculating induction current $I_{La}$, which is provided instead of the voltage-current converting circuit 31. Specifically, the voltage-current converting circuit 31a generates a current proportional to the input voltage Vin while the first switch 11 is being conducted, and sends the current generated to the current-voltage converting capacitor 32. Also, the voltage-current converting circuit 31a draws a current proportional to Vout−Vin in accordance with the input voltage Vin and the output voltage Vout from the current-voltage converting capacitor 32 while the first switch 11 is being cut-off. Note that, the proportional constant when generating the current is the same in the conduction period and in the cut-off period.

Figure 13:
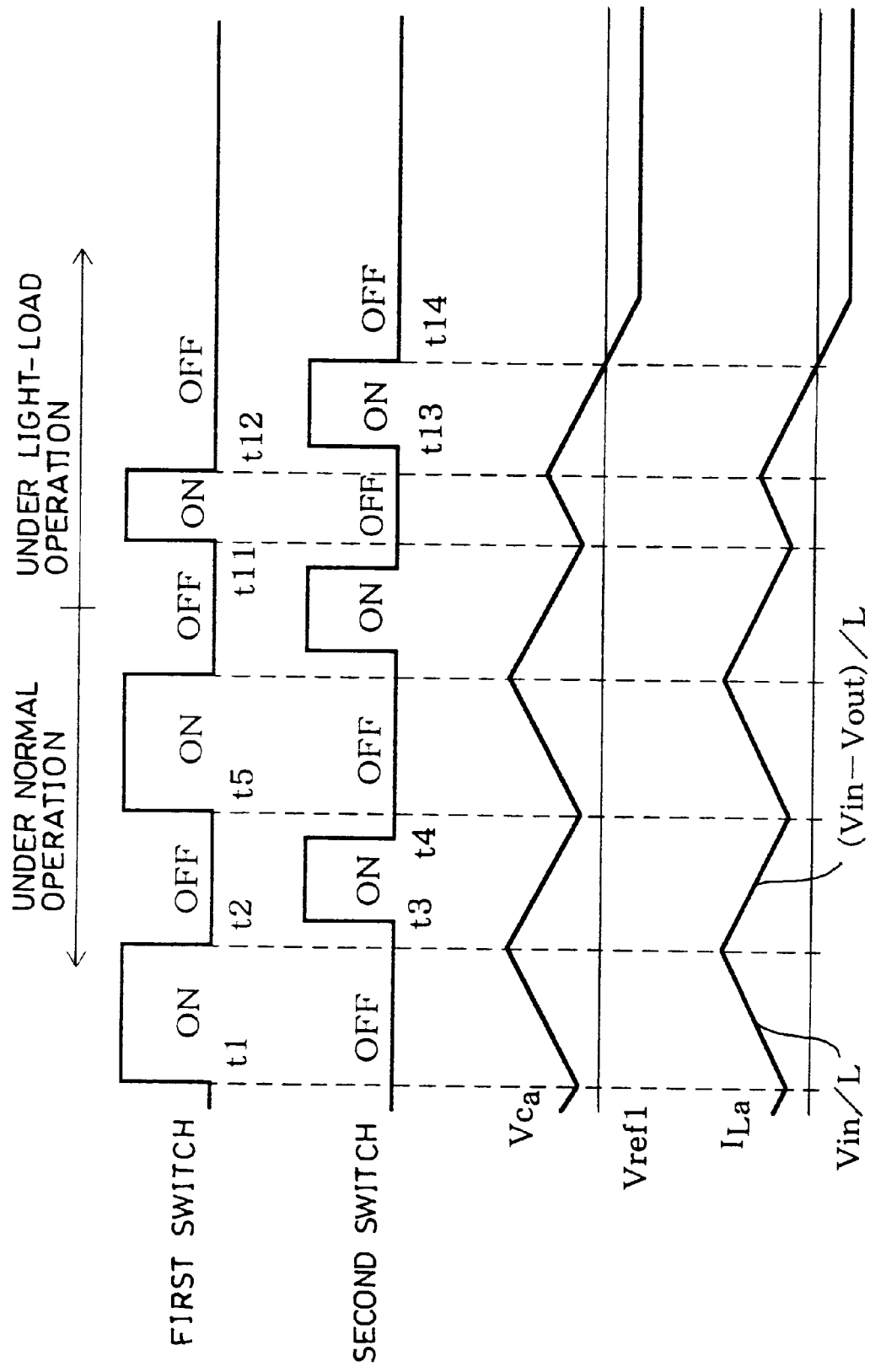
FIG. 13 is a waveform diagram showing an operation of the switching power circuit.

As a result, as shown in FIG. 13, the voltage $Vc_a$ at the both terminals of the current-voltage converting capacitor 32 is changed in proportion to the forward current $I_{La}$ flowing through the inducing element 12. Thus, it is possible to accurately detect, as the time the voltage $Vc_a$ becomes 0V, the time the reverse current starts to flow through the inducing element 12. Thus, when the comparator 33 compares the voltage $Vc_a$ and the reference voltage Vref1, and instructs the control circuit 21 to cut-off the second switch 15 before the voltage $Vc_a$ becomes 0V, the second switch 15 is cut-off before the reverse current flows through the inducing element 12. As a result, the reverse current does not flow through the inducing element 12 even when the output load is small, and it is possible to realize switching power circuit 3a of a step-up type capable of always maintaining high conversion efficiency of, for example, not less than 80 percent.

Figure 14:
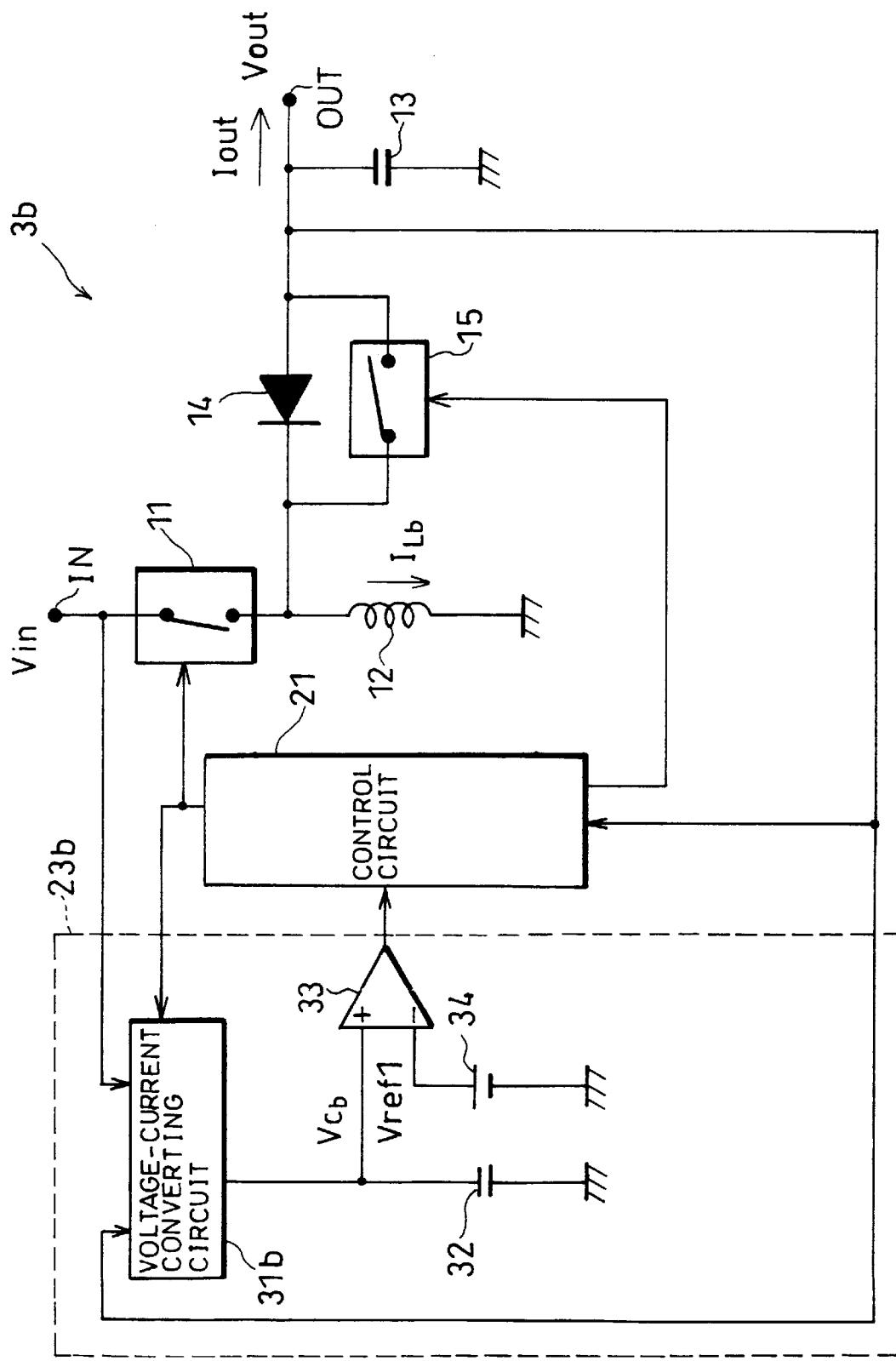
FIG. 14 is a block diagram, which indicates a Eleventh Embodiment of the present invention, showing a main component of a switching power circuit of a reversed type adopting the synchronous rectification system.

The eleventh embodiment will describe the case, referring to FIG. 14, wherein the voltage integral control circuit 23b is structured by adopting an analog integrator in a switching power circuit 3b of a reversed type, similar to the one shown in FIG. 8.

The voltage integral control circuit 23b in accordance with the present embodiment is substantially the same as the voltage integral control circuit 23 of FIG. 10, except for a voltage-current converting circuit 31b for calculating induction current $I_{Lb}$, which is provided instead of the voltage-current converting circuit 31. Specifically, the voltage-current converting circuit 31b generates a current proportional to the input voltage Vin while the first switch 11 is being conducted, and sends the current generated to the current-voltage converting capacitor 32. Also, the voltage-current converting circuit 31b draws from the current-voltage converting capacitor 32 a current proportional to −Vout in accordance with the output voltage Vout while the first switch 11 is being cut-off. Note that, the proportional constant when generating the current is the same in the conduction period and in the cut-off period.

Figure 15:
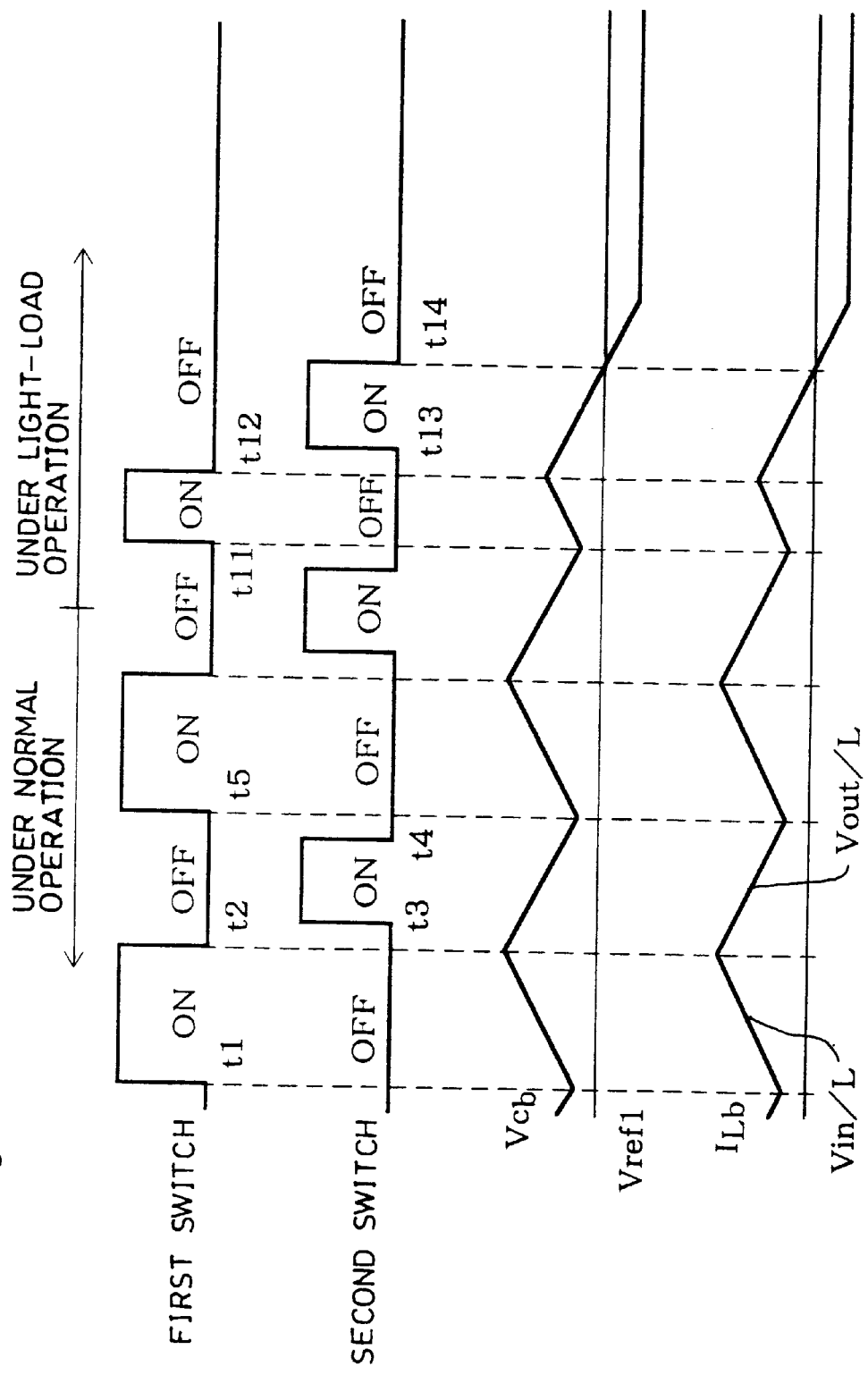
FIG. 15 a waveform diagram showing an operation of the switching power circuit.

As a result, as shown in FIG. 15, the voltage $Vc_b$ at the both terminals of the current-voltage converting capacitor 32 is changed in proportion to the forward current $I_{Lb}$ flowing through the inducing element 12. Thus, it is possible to accurately detect, as the time the voltage $Vc_b$ becomes 0V, the time the reverse current starts to flow through the inducing element 12. Thus, when the comparator 33 compares the voltage $Vc_b$ and the reference voltage Vref1, and instructs the control circuit 21 to cut-off the second switch 15 before the voltage $Vc_b$ becomes 0V, the second switch 15 is cut-off before the reverse current flows through the inducing element 12. As a result, the reverse current does not flow through the inducing element 12 even when the output load is small, and it is possible to realize switching power circuit 3b of a reversed type capable of always maintaining high conversion efficiency of, for example, not less than 80 percent.

Figure 16:
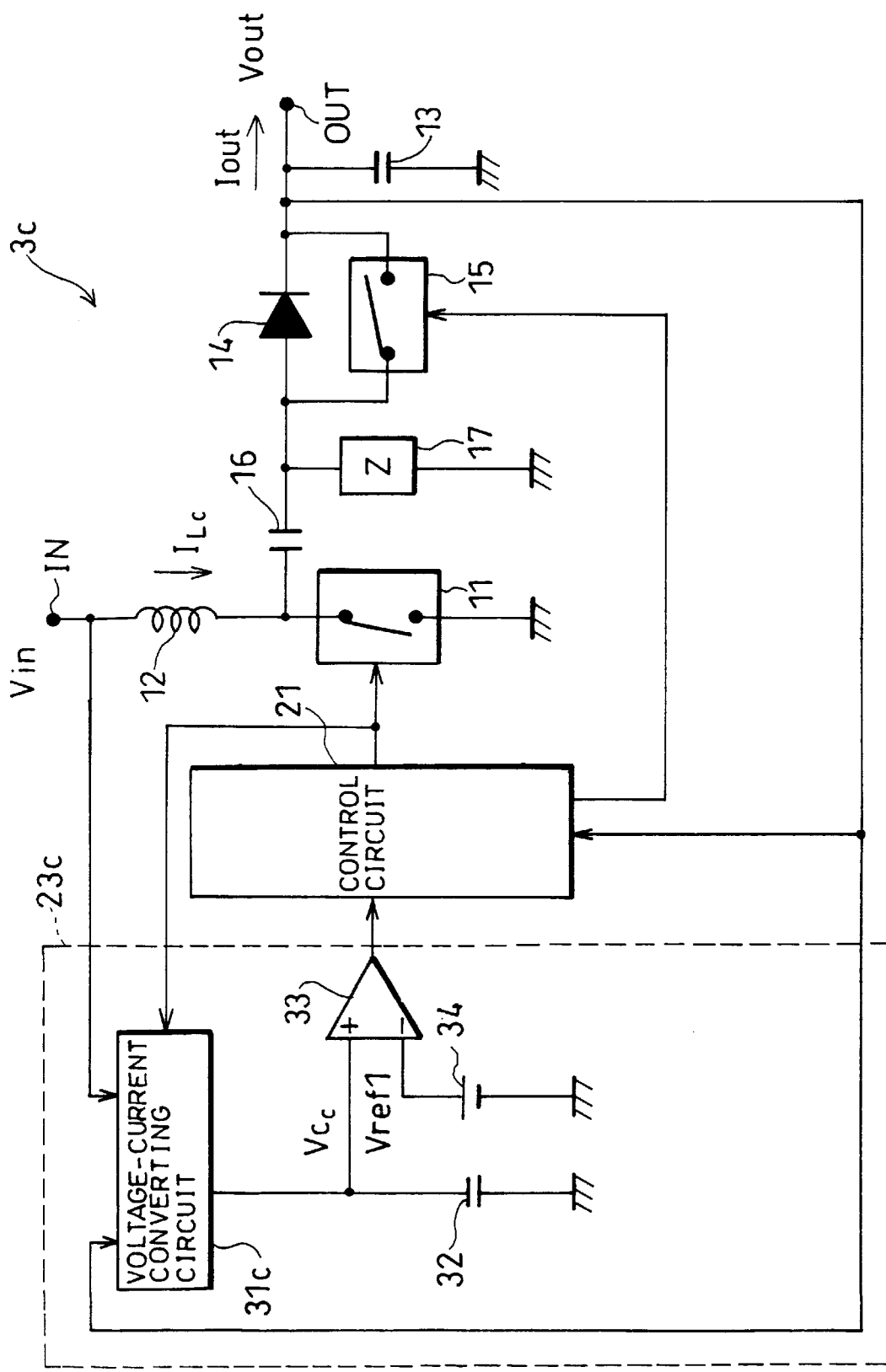
FIG. 16 is a block diagram, which indicates a Twelfth Embodiment of the present invention, showing a main component of a switching power circuit of an up-down type adopting the synchronous rectification system.

The twelfth embodiment will describe the case, referring to FIG. 16, wherein the voltage integral control circuit 23c is structured by adopting an analog integrator in a switching power circuit 3c of an up-down type, similar to the one shown in FIG. 9.

The voltage integral control circuit 23c in accordance with the present embodiment is substantially the same as the voltage integral control circuit 23 of FIG. 10, except for a voltage-current converting circuit 31c for calculating induction current $I_{Lc}$, which is provided instead of the voltage-current converting circuit 31. Specifically, the voltage-current converting circuit 31c generates a current proportional to the input voltage Vin in accordance with the input voltage Vin while the first switch 11 is being conducted, and sends the current generated to the current-voltage converting capacitor 32. Also, the voltage-current converting circuit 31c draws from the current-voltage converting capacitor 32 a current proportional to the output voltage Vout in accordance with the output voltage Vout while the first switch 11 is being cut-off. Note that, the proportional constant when generating the current is the same in the conduction period and in the cut-off period.

Figure 17:
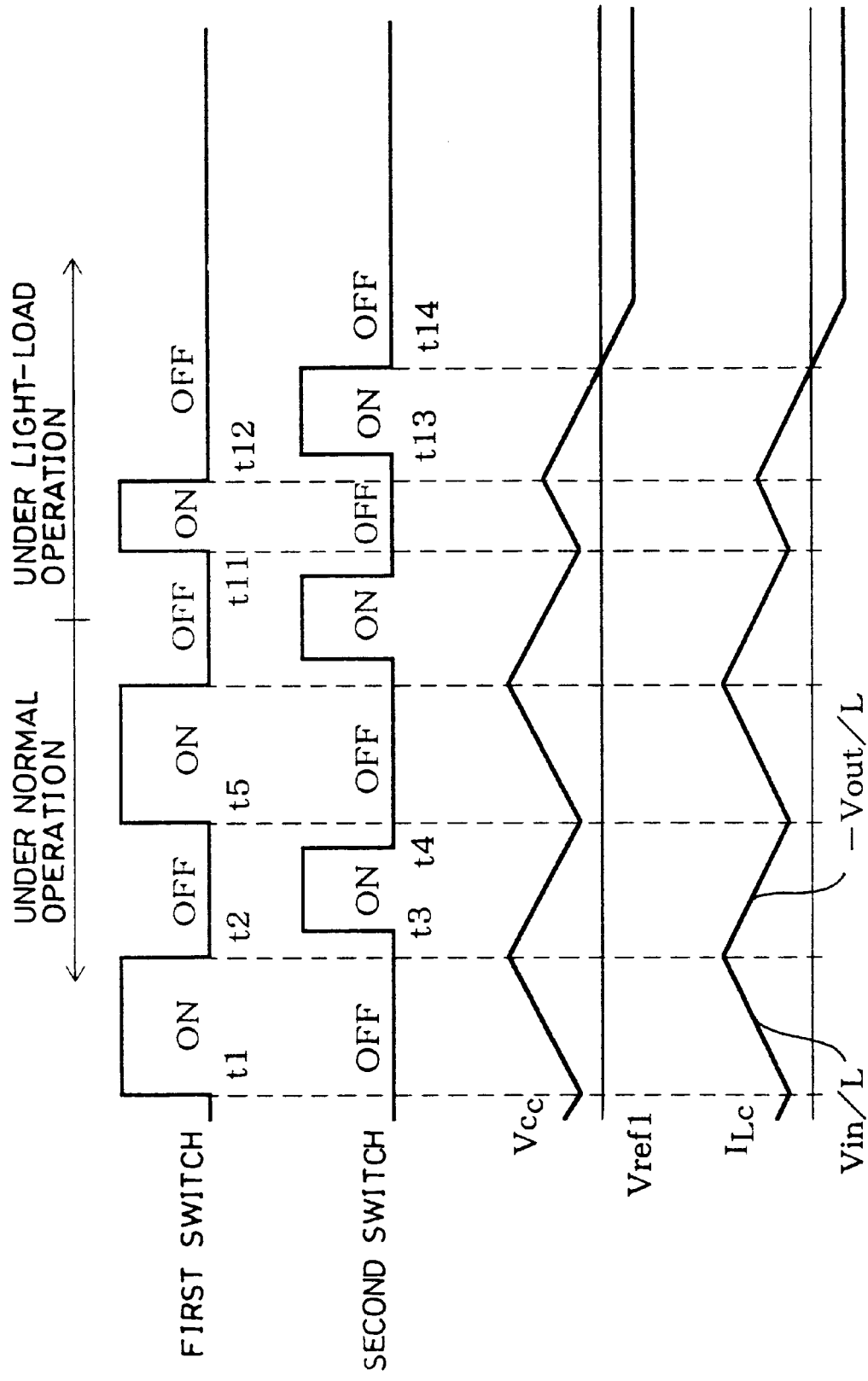
FIG. 17 an waveform diagram showing an operation of the switching power circuit.

As a result, as shown in FIG. 17, the voltage $Vc_c$ at the both terminals of the current-voltage converting capacitor 32 is changed in proportion to the forward current $I_{Lc}$ flowing through the inducing element 12. Thus, it is possible to accurately detect, as the time the voltage $Vc_c$ becomes 0V, the time the reverse current starts to flow through the inducing element 12. Thus, when the comparator 33 compares the voltage $Vc_c$ and the reference voltage Vref1, and instructs the control circuit 21 to cut-off the second switch 15 before the voltage Vc$_c$ becomes 0V, the second switch 15 is cut-off before the reverse current flows through the inducing element 12. As a result, the reverse current does not flow through the inducing element 12 even when the output load is small, and it is possible to realize switching power circuit 3c of an up-down type capable of always maintaining high conversion efficiency of, for example, not less than 80 percent.

In the Fifth through Twelfth Embodiments, the time the reverse current starts to flow through the inducing element 12 is detected in accordance with the input voltage Vin and the output voltage Vout, not by direct detection of the current flowing through the inducing element 12, and therefore the described embodiments are suitable for integration, for example, in IC (Integrated Circuit). The present embodiment describes in detail, referring to FIG. 18, an example of the structure of a switching power circuit, which can be integrated readily. Note that, the explanations will be given through the case of a switching power circuit 4c of an up-down type, similar to that of the Twelfth Embodiment, yet a circuit suitable for integration can also be realized with the circuits of the Ninth through Eleventh Embodiments.

Namely, in the present embodiment, the first switch 11 is composed of an N-channel MOS transistor N1, and the second switch 15 is composed of P-channel MOS transistor P1. The impedance element 17 is constituted by inducing element L1.

A control circuit 21c in accordance with the present embodiment is provided with (a) resistances 41 and 42 for dividing output voltage Vout, (b) a power source 43 for generating a reference voltage Vref2 of a predetermined value, and (c) an error detecting comparator 44, whose positive input terminal receives voltage Vadj of the junction of the resistances 41 and 42 and whose negative input terminal receives the reference voltage Vref2. The control circuit 21c further includes (d) a triangular wave generator 45 for generating a triangular wave of a predetermined frequency, (e) a power source 46 for generating a reference voltage Vref3 of a predetermined value, and (f) a PWM (Phase Width Modulation) comparator 47, whose positive input receives the output of the comparator 44 and the reference voltage Vref3 and whose negative input receives the triangular wave from the triangular wave generator 45. The output of the comparator 47 is applied to a gate of the MOS transistor N1 via an inverter 48, and to a gate of the MOS transistor P1 via a two-input NAND circuit 49.

In this structure, the output voltage Vout is divided by the resistances 41 and 42, and is applied as a feedback voltage Vadj to the error detecting comparator 44. The comparator 44 compares the reference voltage Vref2 and the feedback voltage Vadj, and outputs a voltage in accordance with the difference of the two voltages. The PWM comparator 47 compares the higher of the output voltages of the comparator 44 and the reference voltage Vref3 with the triangular wave generated in the triangular wave generator 45, and generates a pulse signal. Here, the output of the comparator 44 is set such that its pulse width is reduced when the feedback voltage Vadj is larger than the reference voltage Vref2, and that its pulse width is increased when the feedback voltage Vadj is smaller than the reference voltage Vref2. Thus, the pulse width of the pulse signal is controlled in such a manner that the feedback voltage Vadj and the reference voltage Vref2 coincide with each other.

The pulse signal, after inverted by the inverter 48, is applied to the gate of the N-channel MOS transistor N1. The pulse signal is also applied, after inverted by the NAND circuit 49, to the gate of the P-channel MOS transistor P1 while there is no instruction from the voltage integration control circuit 23c to cut-off the second switch 15. Thus, the control is carried out such that the second switch 15 is cut-off while the first switch 11 is being conducted, and that the second switch 15 is conducted while the first switch 11 is being cut-off. As a result, the ON/OFF control of the first and second switches 11 and 15 is carried out so that the output voltage Vout takes a predetermined value Vcon.

Between the inverter 48 and the MOS transistor N1 and between the NAND circuit 49 and the MOS transistor P1 are provided pre-buffers (not shown), respectively, and the delay time of each pre-buffer is set to be longer during the ON state than the OFF state. Thus, the MOS transistors N1 and P1 are controlled so that one of the transistors is not conducted until a predetermined dead time Tdet elapses from the time the other transistor is cut-off.

The comparator 47 compares the reference voltage Vref3 and the triangular wave and generates a pulse signal when the output voltage of the comparator 44 is lower than the reference voltage Vref3. Thus, even when the output voltage Vout is notably low, as in the case of activating the switching power circuit 4c, whereby the maximum value of the pulse width is limited, it is possible to set a limit to the conduction period of the first switch 11, thus preventing damaging of the first switch 11.

Figure 19:
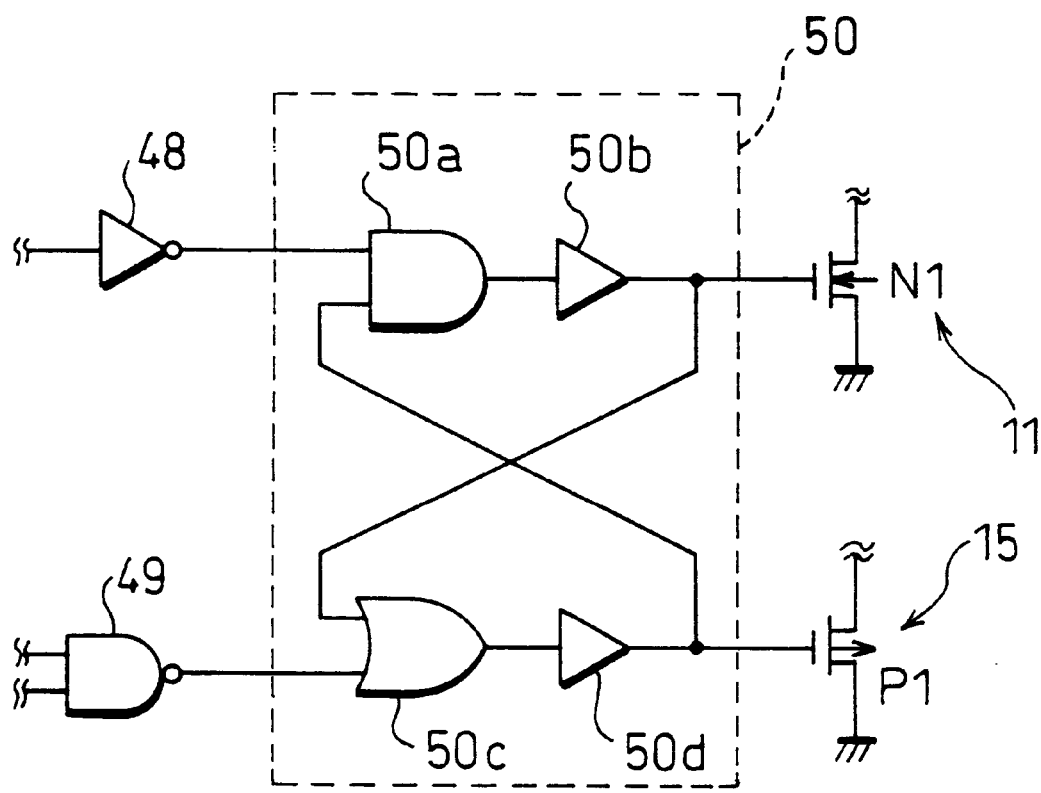
FIG. 19 is a circuit diagram, which indicates a modification example of the present invention, showing a switch timing control circuit provided in the switching power circuit.
Figure 20:
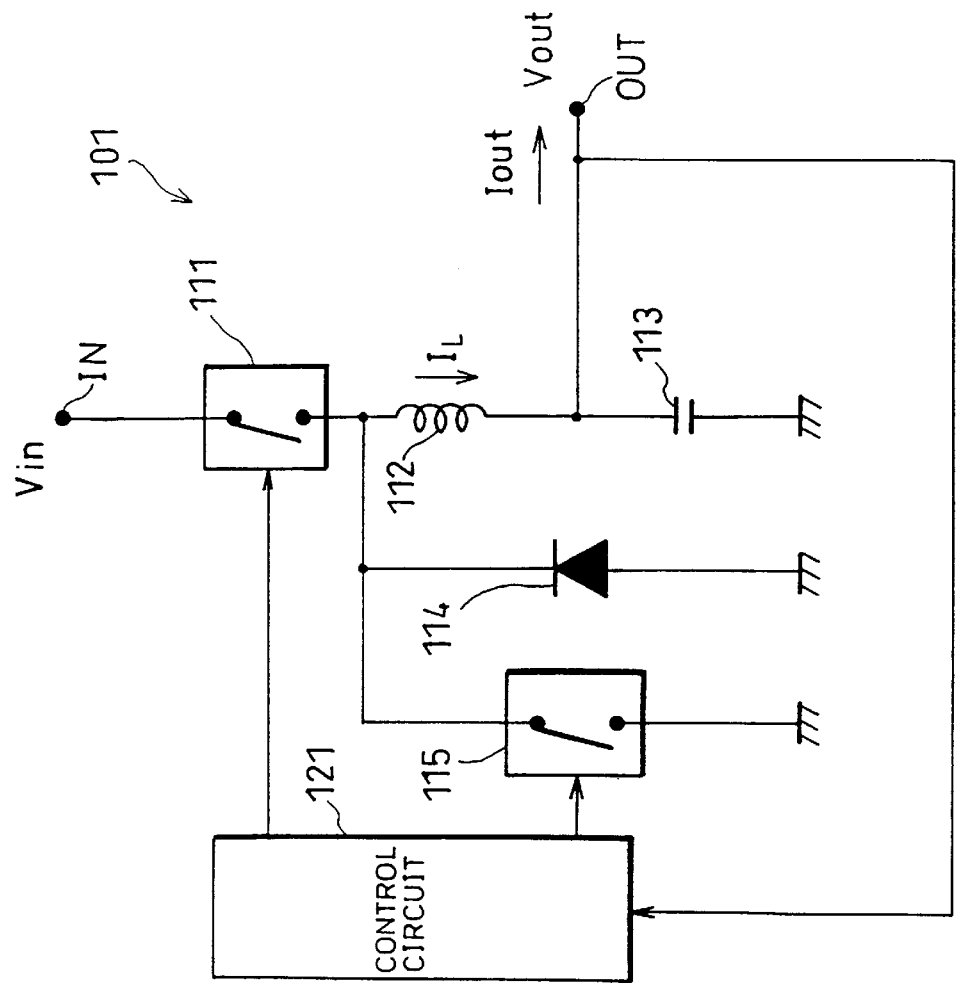
FIG. 20 is a block diagram, which indicates a conventional example, showing a structure of a main component of a synchronous rectifier circuit.
Figure 21:
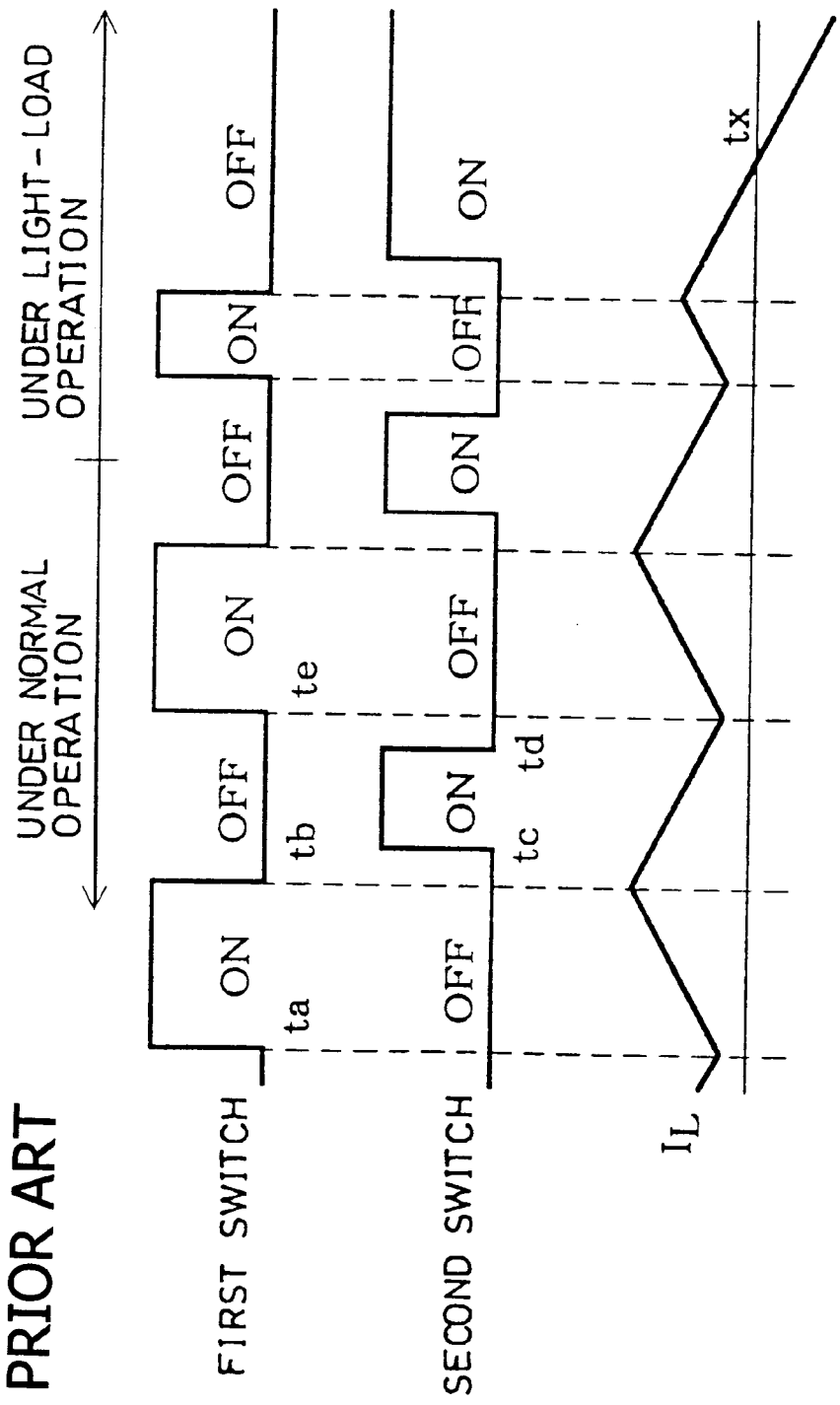
FIG. 21 is a waveform diagram showing an operation of the switching power circuit.

Note that, the method for shifting the switching timing of the MOS transistors N1 and P1 is not limited by the above structure. For example, as shown in FIG. 19, it is possible alternatively to carry out the control by providing a timing control section 50 between (i) the inverter 48 and the NAND circuit 49 and (ii) the MOS transistors N1 and P1. In the timing control circuit 50, the output of the inverter 48 is applied to the gate of the MOS transistor N1 via an AND circuit 50a and a buffer 50b. Similarly, the output of the NAND circuit 49 is applied to the gate of the MOS transistor P1 via an OR circuit 50c and a buffer 50d. The output of the buffer 50d is inputted to the OR circuit 50c, and the output of the buffer 50d is inputted to the AND circuit 50a.

In this structure, the AND circuit 50a maintains its output at low level until the buffer 50d instructs cut-off of the MOS transistor P1, even when the inverter 48 instructs conduction of the MOS transistor N1, so as to prevent conduction of the MOS transistor N1. The output of the AND circuit 50a becomes high level after the buffer 50d instructs cut-off of the MOS transistor P1, and is applied to the gate of the MOS transistor N1 via the buffer 50b. Thus, by the delay time of the AND circuit 50a and the buffer 50b, the conduction timing of the MOS transistor N1 is set to delay from the cut-off timing of the MOS transistor P1.

In the same manner, the OR circuit 50c maintains its output at high level until the buffer 50b instructs cut-off of the MOS transistor N1, even when the NAND circuit 49 instructs conduction of the MOS transistor P1, so as to prevent conduction of the MOS transistor P1. Thus, the conduction timing of the MOS transistor P1 is set to delay from the cut-off timing of the MOS transistor N1.

Figure 18:
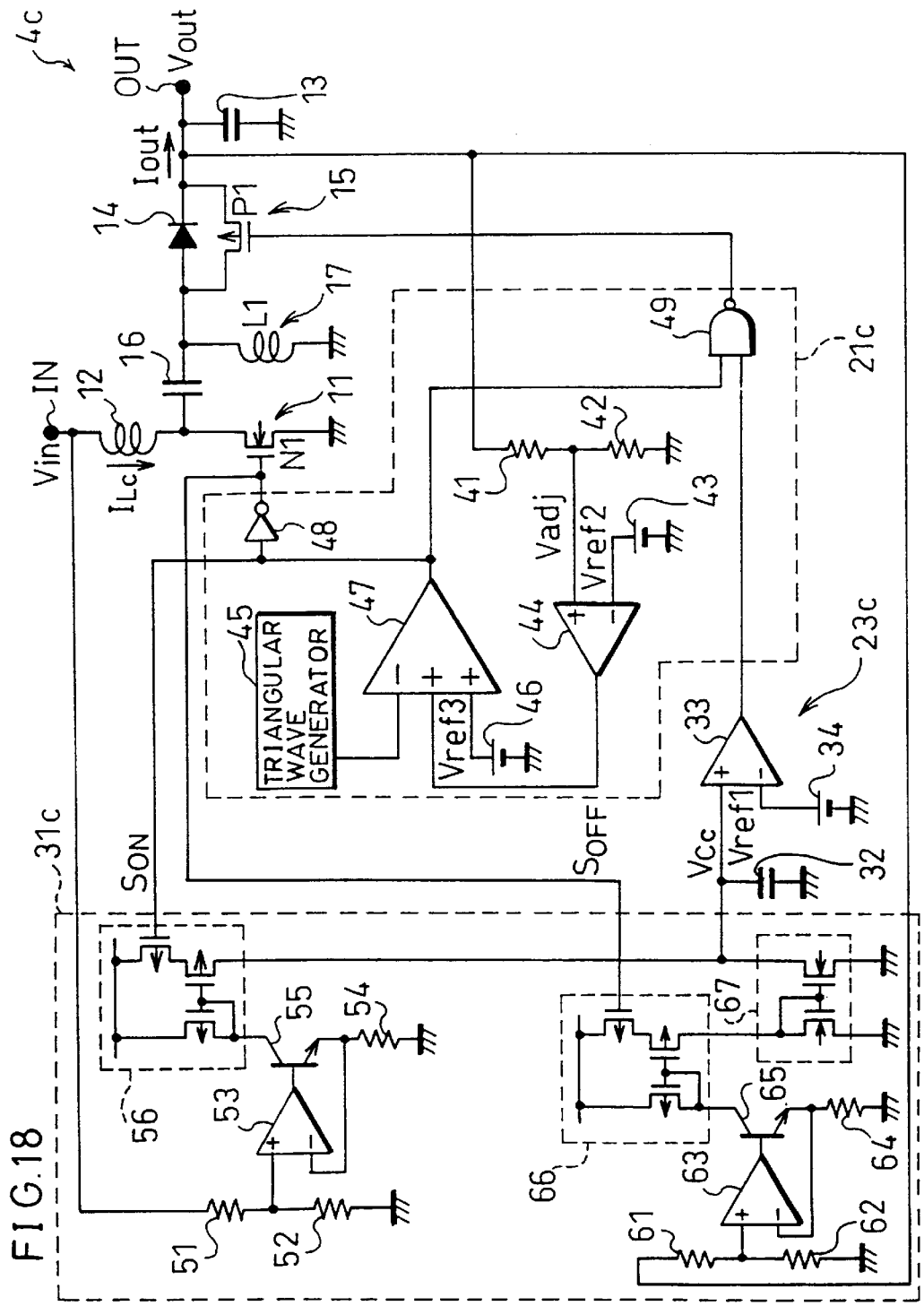
FIG. 18 is a block diagram, which indicates a Thirteenth Embodiment of the present invention, showing a main component of a switching power circuit of an up-down type adopting the synchronous rectification system.

Meanwhile, in order to output a current proportional to the input voltage Vin while the first switch 11 is being conducted, as shown in FIG. 18, a voltage-current converting circuit 31c in accordance with the present embodiment is provided with (a) resistances 51 and 52 for dividing the input voltage Vin, (b) an amplifier 53, whose positive input terminal is connected to the junction of the resistances 51 and 52, (c) a transistor 55 of an NPN type, whose base is connected to the output of the amplifier 53 and whose emitter is grounded via a resistance 54, and (d) a current mirror circuit 56 having a switch, for reflecting and outputting a current having the same value as a collector current of the transistor 55 when receiving from the control circuit 21c a signal $S_{ON}$ which indicates conduction of the first switch 11. The junction of the transistor 55 and the resistance 54 is negatively fed-back to the negative input terminal of the amplifier 53, and the amplifier 53 controls the base voltage of the transistor 55 so that the voltage at the both terminals of the resistance 54 is equal to the voltage of the junction of the resistances 51 and 52. Note that, the amplifier 53 and the current mirror circuit 56 correspond to a first amplifier circuit and a first current mirror circuit, respectively.

In this structure, a voltage generated from the input voltage Vin divided by the resistances 51 and 52 is converted by the amplifier 53 into a current which flows into the resistance 54. The current is reflected by the current mirror circuit 56 when the signal $S_{ON}$ is indicating conduction. This allows the voltage-current converting circuit 31c to output a current proportional to the input voltage Vin to the current-voltage converting capacitor 32 while the first switch 11 is being conducted. Note that, when the signal $S_{ON}$ is not indicating conduction, the current mirror circuit 56 does not operate. Thus, only the output current of a current mirror circuit 67 (mentioned later) is drawn from the current-voltage converting capacitor 32.

In order to output a current proportional to the output voltage Vout while the first switch 11 is being cut-off, the voltage-current converting circuit 31c in accordance with the present embodiment further includes (a) resistances 61 and 62 for dividing output voltage Vout, (b) an amplifier 63, whose positive input terminal is connected to the junction of the resistances 61 and 62, (c) a transistor 65 of an NPN type, whose base is connected to the output of the amplifier 63 and whose emitter is grounded via the resistance 64, (d) a current mirror circuit 66 having a switch, for reflecting and outputting a current having the same value as a collector current of the transistor 65 when receiving from the control circuit 21c a signal $S_{OFF}$ which indicates cut-off of the first switch 11, and (e) a current mirror circuit 67 for reflecting again the output current of the current mirror circuit 66. The junction of the transistor 65 and the resistance 64 is negatively fed-back to the negative input terminal of the amplifier 63, and the amplifier 63 controls the base voltage of the transistor 65 so that the voltage at the both terminals of the resistance 64 is equal to the voltage of the junction of the resistances 61 and 62. Note that, the amplifier 63 and the current mirror circuits 66 and 67 correspond to a second amplifier circuit and a second current mirror circuit respectively.

In this structure, a voltage generated from the output voltage Vout divided by the resistances 61 and 62 is converted by the amplifier 63 into a current which flows into the resistance 64. The current is reflected by the current mirror circuit 66 when the signal $S_{OFF}$ is indicating cut-off, and is further reflected by the current mirror circuit 67 in the direction from the current-voltage converting capacitor 32 to the voltage-current converting circuit 31c. This allows the voltage-current converting circuit 31c to draw a current proportional to the output voltage Vout from the current-voltage converting capacitor 32 while the first switch 11 is being conducted. Note that, the current mirror circuit 66 does not operate when the signal $S_{OFF}$ is indicating conduction. Thus, only the output current of the current mirror circuit 56 is supplied to the current-voltage converting capacitor 32.

In accordance with the described structure, the voltage-current converting circuit 31c supplies a current proportional to the input voltage Vin to the current-voltage converting capacitor 32 while the first switch 11 is being conducted so as to store charge in the current-voltage converting capacitor 32. On the other hand, while the first switch 11 is being cut-off, the voltage-current converting circuit 31c draws a current proportional to the output voltage Vout from the current-voltage converting capacitor 32 so as to release the charge of the current-voltage converting capacitor 32. As a result, the voltage $Vc_c$ at the both terminals of the current-voltage converting capacitor 32 is changed in proportion to the induction current $I_{Lc}$.

When the voltage Vcc drops below the reference voltage Vref1 of a predetermined value, the comparator 33 judges that the induction current $L_{Lc}$ is approaching zero and is beginning to flow in the reverse-direction, and reduces the voltage outputted to the NAND circuit 49. As a result, in the control circuit 21c, the NAND circuit 49 always applies a high-level output to the gate of the P-channel MOS transistor P1, regardless of the output of the comparator 47. In accordance with this structure, the voltage integration control circuit 23c accurately judges the time the induction current $I_{Lc}$ is beginning to flow in the reverse-direction, and as a result the second switch 15 is cut-off by the control circuit 21c.

The control circuit 21c and the voltage integration control circuit 23c having the described structures are circuits which can be integrated easily from members such as amplifier, resistance, and transistor. Thus, when the control circuit 21c and the voltage integration control circuit 23c are to be integrated as an IC, high accurate and high efficient switching power circuit 4c can be realized only by externally providing the following members to the IC: the first switch 11, the inducing element 12, the smoothing capacitor 13, the commutating diode 14, the second switch 15, the capacitor 16, and the impedance element 17. The control circuit 21 includes members, such as the error detecting comparator 44 and the triangular wave generator 45, which operate at high frequencies and require high accuracy. Meanwhile, in the voltage integration control circuit 23c, when the calculation accuracy of the voltage-current converting circuit 31c is low, the induction current $I_{Lc}$ cannot be calculated accurately, and the conduction/cut-off timing of the second switch 15 is shifted, thus lowering the efficiency of the switching power circuit 4c. However, when the control circuit 21c and the voltage integration control circuit 23 are integrated, the accuracies of these circuits can be improved with ease, and it is possible to realize high accurate and high efficient switching power circuit 4c. Note that, the number of components can be reduced by integrating the first switch 11, the commutating diode 14, and the second switch 15. Also, even when the value of the reference voltage Vref2 is constant, by changing the division ratio of the resistances 41 and 42, it is possible to change the target value Vcon of the output voltage Vout. Therefore, when externally providing the resistances 41 and 42, the integrated circuit can be shared among switching power circuits having different target values Vout.

As described in the First Embodiment, it is preferable that the synchronous rectifier circuit (switching power circuit 1) in accordance with the present invention includes an inducing element (12) provided between input and output terminals (IN OUT), a first switch (11) provided between the inducing element and the input terminal, a rectifier element (commutating diode 14), whose one terminal is connected between the first switch and the inducing element, having a polarity for maintaining a first current ($I_L$) flowing through the inducing element, a second switch (15), connected in parallel to the rectifier element, which is conducted so as not to be overlapped with the conduction period of the first switch, an inducing element current detecting circuit (22) for monitoring the first current, and a first control circuit (control circuit 21) for cutting off the second switch.

In the synchronous rectifier circuit having this structure, in normal operation, the energy stored in the inducing element as the first current flowing through the inducing element during the conduction period of the first switch is released in the cut-off period of the first switch. Thus, the switching rectifier circuit functions as the switching power circuit of a step-down type, and controls the ratio of conduction period to cut-off period of the first switch, thus maintaining outputs, such as output voltage or output current, at predetermined values.

In the above structure, the first current is maintained by the parallel circuit of the rectifier element and the second switch while the first switch is being cut-off. Here, the first current flows via the second switch while the second switch is being conducted, and therefore a loss, such as the forward voltage loss of the rectifier element, which occurs when the first current flows through the rectifier element is not generated, thus realizing superbly efficient synchronous rectification even when the output load current is large.

Incidentally, in order to reduce the period the forward current flows through the rectifier element, it is preferable that the conduction period of the second switch is set as long as possible within the range which does not overlap with the conduction period of the first switch. Thus, for most of the time, the control is carried out in such a manner, for example, that the first and second switches are both cut-off during a predetermined dead time, and only one of the first and second switches is conducted in other periods. Note that, in the event where the conduction periods of the first and second switches are overlapped, a feedthrough current flows via both switches, and as a result the efficiency of the synchronous rectifier circuit is lowered significantly.

On the other hand, in light-load operation in which the output load current is significantly low, the proportion of the conduction period of the first switch is significantly shorter compared with the case of normal operation. Under this condition, there is a case where the first switch is not conducted even when the first current approaches zero and is beginning to reverse its direction. If the second switch is kept conducted under this condition, the direction of the first current is reversed, and the output terminal is short-circuited to the ground level via the inducing element, and as a result the efficiency of the synchronous rectifier circuit is lowered significantly.

However, in the above structure, the inducing element current detecting circuit monitors the first current, and detects that the first current is approaching zero and is beginning to reverse its direction. When the first current is beginning to be reversed, the first control circuit cuts off the second switch in accordance with the result of detection, regardless of whether the first switch is being conducted. Thus, the reverse current does not flow through the inducing element even in light-load operation. As a result, it is possible to realize a synchronous rectifier circuit of a step-down type having high conversion efficiency even in light-load operation.

Note that, in normal operation, the inducing element current detecting circuit does not instruct cut-off of the second switch, and as with the conventional synchronous rectifier circuit, the conduction period of the second switch is set to be sufficiently long. Therefore, it is possible to always maintain the conversion efficiency of the synchronous rectifier circuit at high level.

As described in the Second Embodiment, the synchronous rectifier circuit (switching power circuit 1a) in accordance with the present invention may include an inducing element provided between input and output terminals, a rectifier element, provided between the inducing element and the output terminal, having a polarity for maintaining a first current ($I_{La}$) flowing through the inducing element, a first switch whose one terminal is connected between the inducing element and the rectifier element, a second switch, connected in parallel to the rectifier circuit, which is conducted so as not to be overlapped with the conduction period of the first switch, an inducing element current detecting circuit for monitoring the first current, and a first control circuit cutting off the second switch in accordance with an instruction of the inducing element current detecting circuit.

With this structure, the energy stored in the inducing element during the conduction period of the first switch is superimposed on a voltage applied to the input terminal so as to be outputted in the cut-off period of the first switch. Thus, the synchronous rectifier circuit functions as the switching power circuit of a step-up type, and controls the ratio of conduction period to cut-off period of the first switch, thus maintaining outputs, such as output voltage or output current, at predetermined values.

In the above structure, as with the structure of the First Embodiment, the inducing element current detecting circuit monitors the first current, and the first control circuit cuts off the second switch when the first current is approaching zero and is beginning to be reversed, regardless of whether the first switch is being conducted. Thus, the reverse current does not flow through the inducing element even in light-load operation. As a result, it is possible to realize a synchronous rectifier circuit of a step-up type having high conversion efficiency even in light-load operation.

As described in the Third Embodiment, the synchronous rectifier circuit (switching power circuit 1b) in accordance with the present invention may include a first switch provided between input and output terminals, a rectifier element, provided between the first switch and the output terminal, having a polarity in a direction from the output terminal to the input terminal, an inducing element whose one terminal is connected between the rectifier element and the first switch, a second switch, connected in parallel to the rectifier element, which is conducted so as not to be overlapped with the conduction period of the first switch, an inducing element current detecting circuit for monitoring a first current ($I_{Lb}$) flowing through the inducing element, and a first control circuit for cutting off the second switch in accordance with an instruction of the inducing element current detecting circuit.

With this structure, the energy stored in the inducing element during the conduction period of the first switch is outputted with a reversed polarity in the cut-off period of the first switch. Thus, the synchronous rectifier circuit functions as the switching power circuit of a reversed type, and controls the ratio of conduction period to cut-off period of the first switch, thus maintaining outputs, such as output voltage or output current, at predetermined values.

In the above structure, as with the structure of the First Embodiment, the inducing element current detecting circuit monitors the first current, and the first control circuit cuts off the second switch when the first current approaches zero and is beginning to be reversed, regardless of whether the first switch is being conducted. Thus, the reverse current does not flow through the inducing element even in light-load operation. As a result, it is possible to realize a synchronous rectifier circuit of a reversed type having high conversion efficiency even in light-load operation.

As described in the Fourth Embodiment, the synchronous rectifier circuit (switching power circuit 1c) in accordance with the present invention may include, in addition to the structure of the Second Embodiment or the Third Embodiment, a capacitor (16) provided between (i) a junction of the first switch and the inducing element and (ii) the rectifier element, and a short-circuiting inducing element or a short-circuiting resistance (impedance element 17), whose one terminal is connected between the capacitor and the rectifier element.

In this structure, the energy stored in the inducing element during the conduction period of the first switch is outputted via the capacitor. Thus, the synchronous rectifier circuit functions as the switching power circuit of an up-down type, and controls the ratio of conduction period to cut-off period of the first switch, thus maintaining outputs, such as output voltage or output current, at predetermined values.

In the above structure, as with the structure of the First Embodiment, the inducing element current detecting circuit monitors a first current ($I_{Lc}$), and the first control circuit cuts off the second switch when the first current approaches zero and is beginning to be reversed, regardless of whether the first switch is being conducted. Thus, the reverse current does not flow through the inducing element even in light-load operation. As a result, it is possible to realize a synchronous rectifier circuit of an up-down type having high conversion efficiency even in light-load operation.

As described in the Fifth and Ninth Embodiments, the synchronous rectifier circuit (switching power circuits 2 and 3) in accordance with the present invention may include an inducing element provided between input and output terminals, a first switch provided between the inducing element and the input terminal, a rectifier element, whose one terminal is connected between the first switch and the inducing element, having a polarity for maintaining the first current flowing through the inducing element, a second switch connected in parallel to the rectifier element, which is conducted so as not to be overlapped with the conduction period of the first switch, and a second control circuit (voltage integration control circuit 23 and control circuit 21) for estimating the first current ($I_L$) in accordance with the input terminal voltage (Vin) and the output terminal voltage (Vout) so as to control the second switch.

In this structure, instead of directly monitoring the first current using the inducing element current detecting circuit, the first current is estimated by the second control circuit in accordance with the input terminal voltage and the output terminal voltage. Thus, unlike the case where the first current is detected by providing a resistance on a current path of the first current to detect the current or by a magnetic sensor, the second control circuit can be realized by an amplifier which amplifies the voltage. As a result, it is possible to realize a smaller synchronous rectifier circuit having higher efficiency, having the same effect as obtained in the structure of the First Embodiment capable of operating as the switching power circuit of a step-down type.

As described in the Sixth and Tenth Embodiments, the synchronous rectifier circuit (switching power circuits 2a and 3a) in accordance with the present invention may include an inducing element provided between input and output terminals, a rectifier element, provided between the inducing element and the output terminal, having a polarity for maintaining the first current ($I_{La}$) flowing through the inducing element, a first switch whose one terminal is connected between the inducing element and the rectifier element, a second switch, connected in parallel to the rectifier element, which is conducted so as not to be overlapped with the conduction period of the first switch, and a second control circuit (voltage integration control circuit 23a and control circuit 21) for estimating the first current in accordance with the input terminal voltage and the output terminal voltage so as to control the second switch.

In this structure, as with the structure of the Fifth Embodiment, the second control circuit estimates the first current in accordance with the input terminal voltage and the output terminal voltage. Therefore, it is possible to realize a smaller synchronous rectifier circuit having higher efficiency, having the same effect as obtained in the structure of the Second Embodiment capable of operating as the switching power circuit of a step-up type.

As described in the Seventh and Eleventh Embodiments, the synchronous rectifier circuit (switching power circuit 2b and 3b) in accordance with the present invention may include a first switch provided between input and output terminals, a rectifier element, provided between the first switch and the output terminal, having a polarity in a direction from the output terminal to the input terminal, an inducing element whose one terminal is connected between the rectifier element and the first switch, a second switch, connected in parallel to the rectifier element, which is conducted so as not to be overlapped with the conduction period of the first switch, and a second control circuit (voltage integration control circuit 23b and control circuit 21) for estimating, in accordance with the input terminal voltage and the output terminal voltage, the first current ($I_{Lb}$) flowing through the inducing element so as to control the second switch.

In this structure, as with the structure of the Fifth Embodiment, the second control circuit estimates the first current in accordance with the input terminal voltage and the output terminal voltage. Therefore, it is possible to realize a smaller synchronous circuit having higher efficiency, having the same effect as obtained in the structure of the Third Embodiment capable of operating as the switching power circuit of a reversed type.

As described in the Eighth and Twelfth Embodiment, the synchronous rectifier circuit (switching power circuit 2c and 3c) in accordance with the present invention may include, in addition to the structure of the Sixth, Seventh, Tenth, or Eleventh Embodiment, a capacitor provided between (i) a junction of the first switch and the inducing element and (ii) the rectifier element, and a short-circuiting inducing element or a short-circuiting resistance, whose one terminal is connected between the capacitor and the rectifier element.

In this structure, the energy stored in the inducing element during the conduction period of the first switch is outputted via the capacitor. Therefore, it is possible to realize a smaller synchronous rectifier circuit having higher efficiency, having the same effect as obtained in the structure of the Fourth Embodiment capable of operating as the switching power circuit of an up-down type.

Incidentally, the method of the second control circuit for estimating the first currents ($I_L$ to $L_{Lc}$) in accordance with the input terminal voltage and the output terminal voltage or the method of realizing the second control circuit can be realized by various methods. For example, the second control circuit may be realized by an analog circuit or by a digital circuit. It is also possible to calculate, in accordance with the input and output voltages at one instant, the first current in the vicinity of the time at which the first current reverses its direction. As long as the method estimates the first current so that at least the time at which the first current reverses its direction is calculated, a variety of calculation methods may be adopted.

However, it should be noted here that when there is no coincidence between the time the first current actually reverses its direction and the time when the second switch is cut-off in accordance with the estimation result of the first current, the efficiency of the synchronous rectifier circuit is lowered.

As described in the Ninth through Twelfth Embodiments, it is preferable that in the synchronous rectifier circuit (switching power circuits 3 to 3c) in accordance with the present invention, in the structures of the Fifth through Eighth Embodiments, the second control circuit includes a voltage-current converting section (31 to 31c) for generating a current in accordance with the amount of change of the first current ($I_L$ to $I_{Lc}$), a storage capacitor (current-voltage converting capacitor 32) whose first terminal is connected to the output of the voltage-current converting section, and a control section (comparator 33) for controlling the second switch in accordance with voltage (Vc) of the first terminal of the storage capacitor.

In general, the amount of change of the first current can be calculated from the input and output terminal voltages, when it is decided whether the first switch has been conducted. Taking the structures of the Fifth Embodiment and the Ninth Embodiment as an example, when the input and output voltages are Vin and Vout, respectively, and when the reactance of the inducing element is L, the amount of change of the first current becomes, for example, (Vin−Vout)/L if the first switch is conducted, and becomes −Vout/L if the first switch is cut-off.

In the above structure, the voltage-current converting section determines the amount of change of the first current as calculated in accordance with the input and output terminal voltages, and generates a current having the amount in accordance with the amount of change. The current thus generated is stored in the storage capacitor, and therefore the voltage of the first terminal of the storage capacitor is changed in accordance with the integrated value of the amount of change, that is, in accordance with the amount of the first current. As a result, it is possible to estimate with very high accuracy the first current and the time the first current reverses its direction. Therefore, it is ensured that the reverse current is prevented from flowing through the inducing element, and as a result the conversion efficiency of the synchronous rectifier circuit is further improved.

Further, because the voltage-current converting section and the control section are realized by analog circuits, such as amplifier, it is possible to integrate these circuits with other circuits of the synchronous rectifier circuit, for example, with a circuit for deciding the conduction period of the first switch. Also, compared with the case where the circuits are realized by digital circuits, the size of the circuits and the power consumption can be reduced. Therefore, it is possible to realize a smaller synchronous rectifier circuit having low power consumption.

As described in the Thirteenth Embodiment, in the synchronous rectifier circuit (switching power circuit 4c) in accordance with the present invention, in the structure of any one of the Ninth through Twelfth Embodiment, the voltage-current converting circuit may include a first amplifier circuit (amplifier 53) for generating a current proportional to the amount of change of the first current, which occurs in the conduction period of the first switch, in accordance with at least one of the input terminal voltage and the output terminal voltage, a first current mirror circuit (current mirror circuit 56) for sending a current equal in amount to the output current of the first amplifier circuit to the first terminal of the storage capacitor only when the first switch is being conducted, a second amplifier circuit (amplifier circuit 63) for generating a current proportional to the amount of change of the first current, which occurs in the cut-off period of the first switch, in accordance with at least one of the input terminal voltage and the output terminal voltage, and a second current mirror circuit (current mirror circuits 66 and 67) for drawing a current equal in amount to the output current of the second amplifier circuit from the first terminal of the storage capacitor only when the first switch is being cut-off.

In this structure, in the conduction period of the first switch, the first amplifier circuit and the first current mirror circuit come into operation, and a charge is stored in the first terminal of the storage capacitor. On the other hand, in the cut-off period of the first switch, the second amplifier circuit and the second current mirror circuit come into operation, and a charge is released from the first terminal of the storage capacitor. This allows the voltage-current converting circuit to generate with high accuracy a current in accordance with the amount of change of the first current both in the conduction and cut-off periods of the first switch.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A synchronous rectifier circuit, comprising:
   an output terminal for providing an output;
   a first switch, having a ratio of conduction period to cut-off period controlled in accordance with the output at the output terminal;
   an inducing element, connected to said first switch, for storing an energy of a first current flowing therethrough;
   a rectifier element, connected to said inducing element;
   a second switch, connected in parallel with said rectifier element, said second switch being conductive so as not to overlap with the conduction period of said first switch; and
   control means for cutting off said second switch just before an energy stored in said inducing element is completely released regardless of whether said first switch is conductive or cut-off, the energy being stored in said inducing element while said first switch is conductive,
   said inducing element is provided between an input terminal and the output terminal, said first switch is provided between said inducing element and the input terminal, and said rectifier element has a terminal which is connected between said first switch and said inducing element and has a polarity for maintaining the first current,
   said control means controlling said second switch so as to satisfy $$T2off <= Ton \cdot (Vin-Vout)/Vout,$$

where Vin is a voltage of the input terminal, Vout is a voltage of the output terminal, Ton is a conduction time of said first switch, and T2off is a period between cut-off of said first switch and cut-off of said second switch.

2. A synchronous rectifier circuit, comprising:
   an output terminal for providing an output;
   a first switch, having a ratio of conduction period to cut-off period controlled in accordance with the output at the output terminal;

an inducing element, connected to said first switch for storing an energy of a first current flowing therethrough;

a rectifier element, connected to said inducing element;

a second switch, connected in parallel with said rectifier element, said second switch being conductive so as not to overlap with the conduction period of said first switch; and control means for cutting off said second switch just before an energy stored in said inducing element is completely released, regardless of whether said first switch is conductive or cut-off, the energy being stored in said inducing element while said first switch is conductive, said inducing element is provided between an input terminal and the output terminal, said rectifier element is provided between said inducing element and the output terminal and has a polarity for maintaining the first current, and said first switch has a terminal which is connected between said inducing element and said rectifier element, said control means controlling said second switch so as to satisfy $$T2off \le Ton \cdot Vin/(Vout-Vin),$$

where Vin is a voltage of the input terminal, Vout is a voltage of the output terminal, Ton is a conduction time of said first switch, and T2off is a period between cut-off of said first switch and cut-off of said second switch.

3. A synchronous rectifier circuit, comprising:

an output terminal for providing an output;

a first switch, having a ratio of conduction period to cut-off period controlled in accordance with the output at the output terminal;

an inducing element, connected to said first switch, for storing an energy of a first current flowing therethrough;

a rectifier element, connected to said inducing element;

a second switch, connected in parallel with said rectifier element, said second switch being conductive so as not to overlap with the conduction period of said first switch; and control means for cutting off said second switch just before an energy stored in said inducing element is completely released, regardless of whether said first switch is conductive or cut-off, the energy being stored in said inducing element while said first switch is conductive, said first switch is provided between an input terminal and the output terminal, said rectifier element is provided between said first switch and the output terminal and has a polarity in a direction from the output terminal to the input terminal, and said inducing element has a terminal which is connected between said rectifier element and said first switch, said control means controlling said second switch so as to satisfy $$T2off \le Ton \cdot Vin/(-Vout),$$

where Vin is a voltage of the input terminal, Vout is a voltage of the output terminal, Ton is a conduction time of said first switch, and T2off is a period between cut-off of said first switch and cut-off of said second switch.

4. A synchronous rectifier circuit, comprising:

an output terminal for providing an output;

a first switch, having a ratio of conduction period to cut-off period controlled in accordance with the output at the output terminal;

an inducing element, connected to said first switch, for storing an energy of a first current flowing therethrough;

a rectifier element, connected to said inducing element;

a second switch, connected in parallel with said rectifier element, said second switch being conductive so as not to overlap with the conduction period of said first switch; and control means for cutting off said second switch just before an energy stored in said inducing element is completely released, regardless of whether said first switch is conductive or cut-off, the energy being stored in said inducing element while said first switch is conductive, said inducing element is provided between an input terminal and the output terminal, said rectifier element is provided between said inducing element and the output terminal and has a polarity for maintaining the first current, and said first switch has a terminal which is connected between said inducing element and said rectifier element, the synchronous rectifier circuit further comprising
a capacitor provided between (i) a junction of said first switch and said inducing element and (ii) said rectifier element; and
a short-circuiting inducing element or a short-circuiting resistance, having a terminal which is connected between said capacitor and said rectifier element, said control means controlling said second switch so as to satisfy $$T2off \le Ton \cdot Vin/Vout,$$

where Vin is a voltage of the input terminal, Vout is a voltage of the output terminal, Ton is a conduction time of said first switch, and T2off is a period between cut-off of said first switch and cut-off of said second switch.

* * * * *